(12) United States Patent
Sato et al.

(10) Patent No.: US 6,247,628 B1
(45) Date of Patent: Jun. 19, 2001

(54) ULTRASONIC VIBRATION BONDING TOOL

(75) Inventors: Shigeru Sato; Seiya Nakai, both of Fukuoka-ken (JP)

(73) Assignee: Ultex Corporation, Fukouka-Ken (JP)

( * ) Notice: Subject to any disclaimer, the term of this patent is extended or adjusted under 35 U.S.C. 154(b) by 0 days.

(21) Appl. No.: 09/630,410

(22) Filed: Aug. 1, 2000

(30) Foreign Application Priority Data

Aug. 2, 1999 (JP) .................................................. 11-218854
Dec. 3, 1999 (JP) .................................................. 11-345448
Jul. 27, 2000 (JP) .......................................................... 227813

(51) Int. Cl.[7] .......................... B23K 37/00; B23K 37/02; B23K 20/10
(52) U.S. Cl. ...................... 228/1.1; 228/44.3; 228/44.7; 228/45; 228/110.1
(58) Field of Search ...................... 228/1.1, 45, 110.1, 228/44.3, 44.7; 156/73.1, 580.1, 580.2; 29/470.1, 470.3

(56) References Cited

U.S. PATENT DOCUMENTS

| | | | |
|---|---|---|---|
| 3,752,380 | * 8/1973 | Shoh | 228/1 |
| 4,799,614 | * 1/1989 | Welter et al. | 228/1.1 |
| 4,867,370 | * 9/1989 | Welter et al. | 228/110 |
| 5,603,444 | * 2/1997 | Sato | 228/1.1 |
| 5,730,832 | * 3/1998 | Sato et al. | 156/499 |
| 5,883,460 | * 3/1999 | Sato et al. | 310/348 |
| 5,884,831 | * 3/1999 | Sato et al. | 228/6.2 |
| 5,931,367 | * 8/1999 | Sato et al. | 228/1.1 |
| 6,109,502 | * 8/2000 | Sato | 228/1.1 |
| 6,168,063 | * 1/2001 | Sato et al. | 228/1.1 |

* cited by examiner

Primary Examiner—Tom Dunn
Assistant Examiner—Zidia Pittman
(74) Attorney, Agent, or Firm—Sughrue, Mion, Zinn, Macpeak & Seas, PLLC

(57) ABSTRACT

An ultrasonic vibration bonding tool comprising a square bar-like horn body, bonding working portions projecting from the upper and lower surfaces of the horn body at the central maximum vibration amplitude point, and crooked support portions projecting from front and rear surfaces of the horn body at the two minimum vibration amplitude points which are separate the same distance from the bonding working portions on both sides. Proper bonding can be carried out with this ultrasonic vibration bonding tool.

10 Claims, 14 Drawing Sheets

ULTRASONIC VIBRATION BONDING TOOL

BACKGROUND OF THE INVENTION

1. [Field of the Invention]

The present invention relates to an ultrasonic vibration tool for bonding overlapped portions of a plurality of members to be bonded together made from metals with ultrasonic vibration.

2. [Description of the Prior Art]

FIG. 25 shows the support structure of a tool by a holder disclosed by Japanese Patent Publication No. 2911394. In FIG. 25, reference numeral 251 denotes an ultrasonic horn having a length equal to the wavelength of resonance frequency (length from the maximum vibration amplitude point f13 to the maximum vibration amplitude point f17), 252 bonding working portions projecting outward from the ultrasonic horn 251 at the central maximum vibration amplitude point f15 of the ultrasonic horn 251, 253 a round bar-like booster having a length equal to the half of the wavelength of resonance frequency (length from the maximum vibration amplitude point f11 to the maximum vibration amplitude point f13), 254 a cylindrical support portion projecting outward from the booster 253 at the central minimum vibration amplitude point f12 of the booster 253, 255 a round bar-like booster which is symmetrical to the booster 253 and has a length equal to the half of the wavelength of resonance frequency (length from the maximum vibration amplitude point f17 to the maximum vibration amplitude point f19), 256 a cylindrical support portion which is symmetrical to the support portion 254 and projects outward from the booster 255 at the central minimum vibration amplitude point f18 of the booster 255, 257 a transducer, 258 a holder, 259 and 260 cylindrical clamp portions which have a slit in part of the wall and project downward from both end portions of the holder 258, 261 a mounting table placed right below the bonding working portion 252, and 262 and 263 a plurality of members to be bonded together which are made from metals. The booster 253 and 255 are connected coaxial to both ends of the ultrasonic horn 251 by unshown headless screws, and the transducer 257 is connected coaxial to the end portion of the booster 253 by an unshown headless screw. While the support portion 254 is inserted in the inside of the clamp portion 259 and the support portion 256 is inserted in the inside of the clamp portion 260, the clamp portions 259 and 260 are fastened by unshown bolts to narrow the widths of the slits and hold the support portions 254 and 256 from the outside, respectively. The holder 258 is attached to a piston rod which is a vertically movable output portion of a pressure unit such as an air cylinder. The member 262 and 263 to be bonded together are mounted on the mounting table 261 in such a manner that they are placed one upon the other. In this state, the holder 258 is moved down by the air cylinder, the bonding working portion 252 and the mounting table 261 hold the members 262 and 263 to be bonded together by pressure, ultrasonic vibration is transmitted from the transducer 257 to the ultrasonic horn 251 through the booster 253, the bonding working portion 252 vibrates in a direction shown by an arrow X, this vibration is transmitted from the bonding working portion 252 to the members 262 and 263 to be bonded together, the contact portions of the members 262 and 263 to be bonded together vibrate in a horizontal direction while they are pressed by the bonding working portion 252 and the mounting table 261, frictional heat is generated between the contact portions, and the contact portions of the members 262 and 263 to be bonded together are thereby activated and bonded together.

However, the above support structure of the prior art tool is such that the boosters 253 and 255 having a length equal to the half of the wavelength of resonance frequency are connected to both ends of the ultrasonic horn 251 which has a length equal to the wavelength of resonance frequency and the cylindrical support portions 254 and 256 of the boosters 253 and 255 are held by the cylindrical clamp portions 259 and 260 of the holder 258, respectively. That is, since the cylindrical support portions 254 and 256 are held by the cylindrical clamp portions 259 and 260, respectively, the distance between the support portion 254 and the other support portion 256 must be at least the total of the wavelength and the half of the wavelength of resonance frequency in order to secure as wide a working space as possible for the members 262 and 263 to be bonded together. Therefore, when the bonding working portion 252 and the mounting table 261 hold the members 262 and 263 to be bonded together by pressure, there is a possibility that the ultrasonic horn 251 and the boosters 253 and 255 may bend upward in an arc form with the support portions 254 and 256 as joints. If they bend, the vibration state, that is, resonance state goes wrong, thereby causing a bonding failure. To solve this problem, the present applicant developed a plate-like ultrasonic horn 271 shown in FIG. 26 and used it in place of the above ultrasonic horn 251. However, when the members 262 and 263 to be bonded together are a semiconductor chip and a circuit board and the semiconductor chip is surface mounted on the circuit board by ultrasonic vibration bonding, the basic weight to be applied to each bump (electrode) of the semiconductor chip is limited. Since the number of bumps is small, it is difficult to control the bonding weight at the time of bonding when the bonding weight (weight required for bonding) which is obtained by multiplying the number of bumps of the semiconductor chip by the basic weight is lower than the total weight of the boosters 253 and 255 and the ultrasonic horn 271. On the other hand, when the number of bumps is large and the bonding weight is high, there may occur a bonding failure that the ultrasonic horn 251 and the boosters 253 and 255 bend and some of the bumps of the semiconductor chip are not bonded to the pads (electrodes) of the circuit board properly.

SUMMARY OF THE INVENTION

It is therefore an object of the present invention to provide an ultrasonic vibration bonding tool which can be made light in weight and can reduce the distance between support portions.

According to a first aspect of the present invention, there is provided an ultrasonic vibration bonding tool for bonding overlapped portions of a plurality of members to be bonded together made from metals by ultrasonic vibration, which comprises a square bar-like horn body, bonding working portions which are provided on the upper and lower surfaces of the horn body at the central maximum vibration amplitude point of the horn body, and crooked support portions which project from the front and rear surfaces of the horn body at the two minimum vibration amplitude points which are separate the same distance from the bonding working portions on both sides. According to the present invention, since the two surfaces on which the bonding working portions are provided of the square bar-like horn body are perpendicular to the two surfaces on which the support portions are provided of the square bar-like horn body, a wide working space can be secured for the members to be bonded together without being narrowed by the support portions even when the support portions are provided on the square bar-like horn body at the closest two minimum vibration amplitude points which are separate the same distance from the bonding working portions on both sides. When the tool is held by the holder at both sides, the distance between the support portions can be set equal to or shorter than the wavelength of resonance frequency. Since the length of the tool can be set to the wavelength of resonance frequency, the tool becomes small in size and light in weight.

According to a second aspect of the present invention, there is provided an ultrasonic vibration bonding tool, wherein each of the support portions comprises a thick root portion connected to the horn body, a thin intermediate portion which extends from the root portion toward the end portion of the horn body without contacting the horn body, a thick projecting portion which projects outward from the intermediate portion and an end portion which extends from the projecting portion toward the center of the horn body without contacting the intermediate portion. Therefore, the thin intermediate portion absorbs vibration which is transmitted from the root portion toward the end portion at the time of bonding and ultrasonic vibration generated by the transducer is transmitted from the tool to the bonding working portions efficiently and properly.

According to a third aspect of the present invention, there is provided an ultrasonic vibration bonding tool, wherein the end portions have a through hole for storing a bolt. Therefore, the end portions can be directly fastened to the holder by bolts, thereby simplifying the attachment work of the tool.

According to a fourth aspect of the present invention, there is provided an ultrasonic vibration bonding tool, wherein the end portions have a recess portion for storing the head portion of a bolt, which is larger than the through hole for storing a bolt. Since the head portion of the bolt is stored in the recess portion, the bolt does not project from the end portion and does not narrow the working space for the members to be bonded together.

According to a fifth aspect of the present invention, there is provided an ultrasonic vibration bonding tool, wherein the support portions are provided on the horn body asymmetrical about the vibration direction of the horn body as a linear symmetry axis. Therefore, the mass of the tool becomes small, the control of weight to be applied at the time of bonding becomes easy, and even small members can be bonded together with ultrasonic vibration properly.

According to a sixth aspect of the present invention, there is provided an ultrasonic vibration bonding tool, wherein each of the support portions comprises a thick root portion which projects from the location of the minimum vibration amplitude point of the horn body, a thin intermediate portion which extends from the root portion toward the end portion of the horn body without contacting the horn body, a thick projecting portion which projects outward from the intermediate portion, and an end portion which extends from the projecting portion toward the intermediate portion of the horn body without contacting the intermediate portion. Therefore, even if the positions of the minimum vibration amplitude points of the tool are shifted from their theoretical positions, the intermediate portions absorb vibration from the root portions to the end portions, not only the tool but also the holder for holding the tool and the pressure unit for vertically driving the holder do not become shaky, and even small members can be bonded together with ultrasonic vibration properly.

According to a seventh aspect of the present invention, there is provided an ultrasonic vibration bonding tool, wherein each of the support portions has an attachment surface parallel to the bonding working portion of the horn body. Therefore, the attachment work of the tool becomes easy.

According to an eight aspect of the present invention, there is provided an ultrasonic vibration bonding tool, wherein each of the support portions has an attachment surface perpendicular to the bonding working portion of the horn body. Therefore, the support portions can be fastened to the holder by bolts on a front side, thereby making it easier to attach the tool.

According to a ninth aspect of the present invention, there is provided an ultrasonic vibration bonding tool which comprises support portions which project from the positions of the minimum vibration amplitude points of the horn body and slanting surfaces formed on the support portions as attachment surfaces. Therefore, the attachment position of the tool to the holder becomes accurate and members can be bonded together with ultrasonic vibration properly.

According to a tenth aspect of the present invention, there is provided an ultrasonic vibration bonding tool, wherein slanting surfaces are formed as the lower attachment surfaces of the support portions, and the upper attachment surfaces of the support portions are formed as flat surfaces parallel to the bonding working portions of the horn body. Therefore, weight at the time of bonding is applied to the support portions in a vertical direction without generating a component, and the support portions do not receive external force which moves them in a vibration direction.

The above and other objects, features and advantages of the invention will become more apparent from the following description when taken in conjunction with the accompanying drawings.

DETAILED DESCRIPTION OF THE PREFERRED EMBODIMENTS

Figure 1:
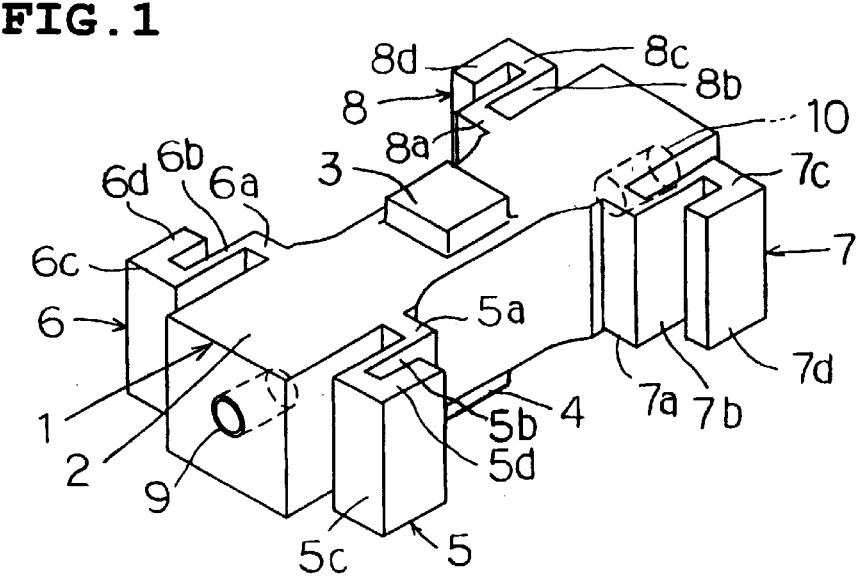
FIG. 1 is a perspective view of a tool according to a first embodiment of the present invention.
Figure 2:
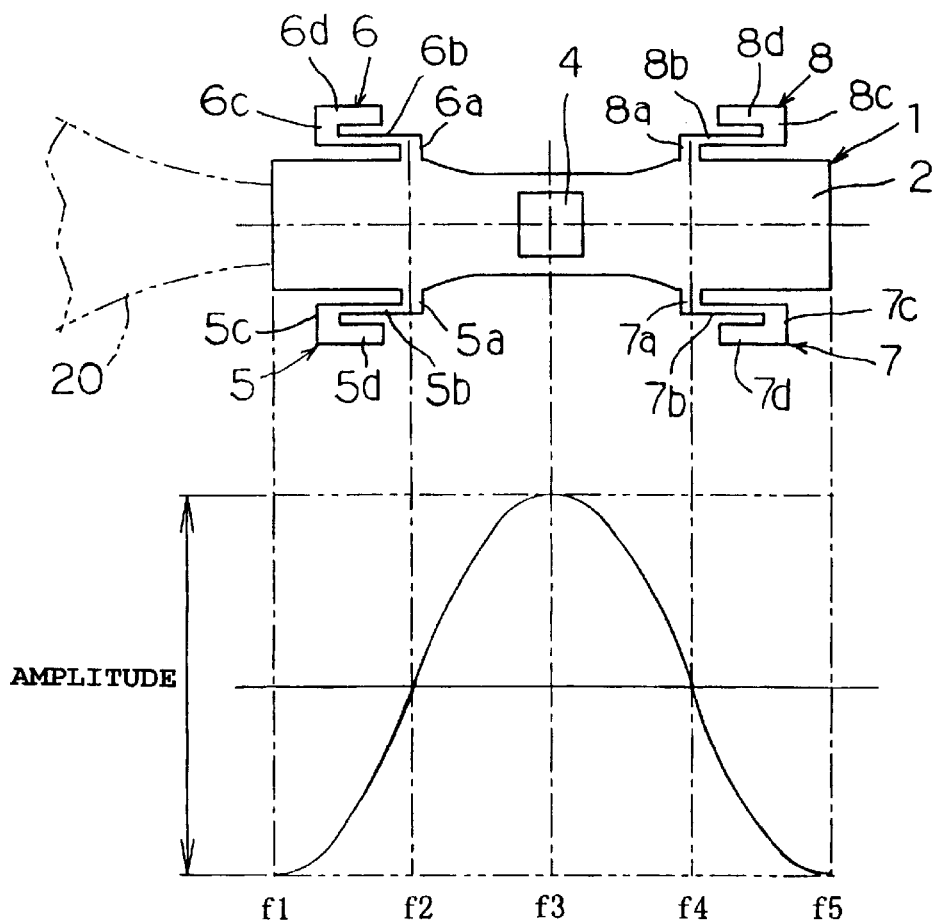
FIG. 2 is a diagram typically showing the tool and ultrasonic vibration of the first embodiment.
Figure 3:
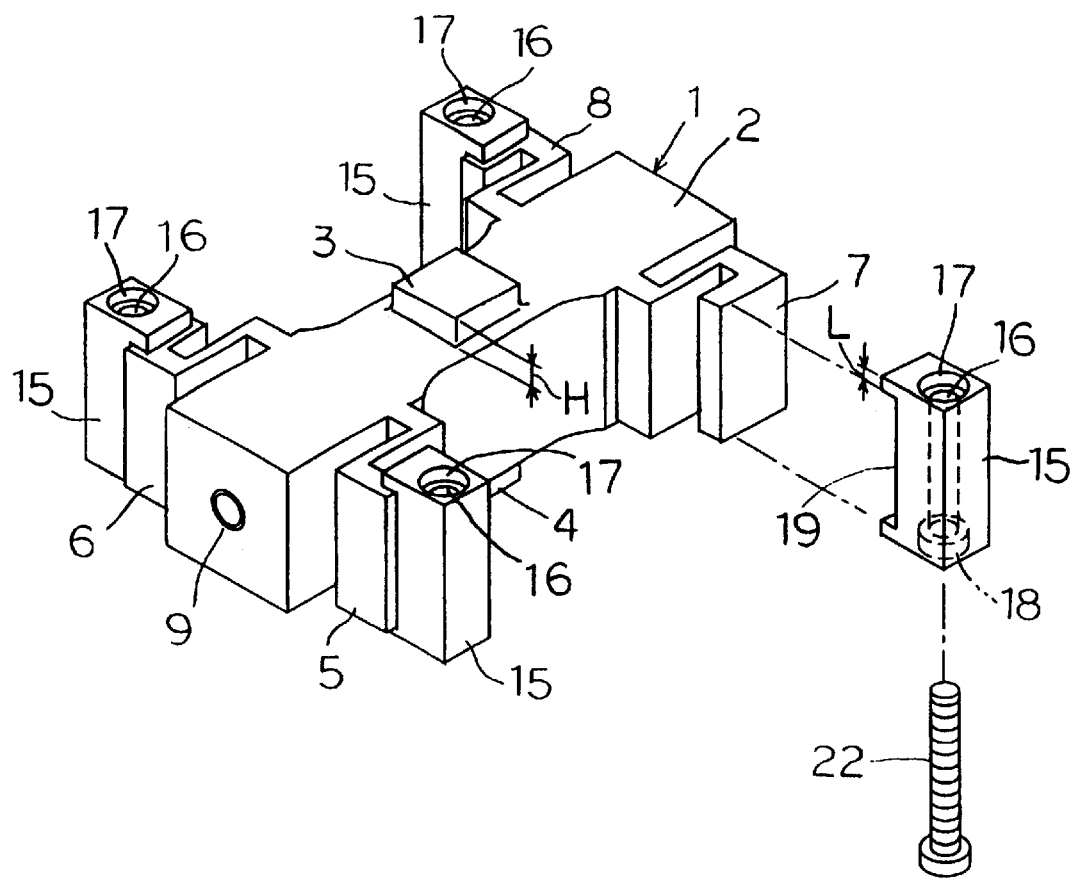
FIG. 3 is a perspective view of the tool and clampers of the first embodiment.
Figure 4:
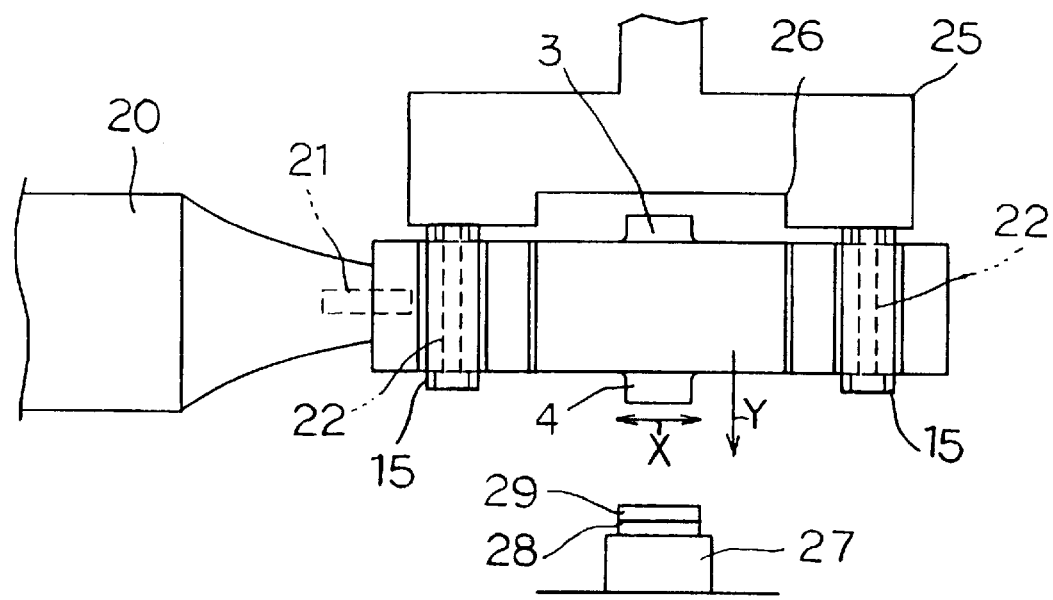
FIG. 4 is a diagram for typically explaining the ultrasonic vibration bonding of the first embodiment.

FIGS. 1 to 4 show a first embodiment of the present invention. FIG. 1 shows the appearance of a tool 1, FIG. 2 shows the relationship between the tool 1 and ultrasonic vibration, FIG. 3 shows the tool 1 and clampers 15, and FIG. 4 shows that the tool 1 is attached to a holder 25. In FIG. 1, reference numeral 1 denotes a tool called "ultrasonic horn", 2 a square bar-like horn body of the tool 1, 3 and 4 bonding working portions projecting outward from the upper and lower surfaces of the horn body 2, 5, 6, 7 and 8 crooked support portions projecting outward substantially like a letter S from the front and rear sides of the horn body 2, and 9 and 10 screw holes formed in the center portions of the right and left end surfaces of the horn body 2. The tool 1 is formed as a single body which comprises the horn body 2, bonding working portions 3 and 4, support portions 5 to 8 and screw holes 9 and 10 and is made from a material having excellent acoustic characteristics such as a titanium alloy or hardened iron.

In FIG. 2, the horn body 2 has a length equal to the wavelength of resonance frequency of ultrasonic vibration transmitted from the transducer 20 shown in FIG. 4 (length from the maximum vibration amplitude point f1 to the maximum vibration amplitude point f5). The bonding working portions 3 and 4 project outward from the horn body 2 at the central maximum vibration amplitude point f3 of the horn body 2 and are square. The support portions 5 to 8 are crooked and project outward from the horn body 2 at the two minimum vibration amplitude points f2 and f4 which are separate the same distance from the bonding working portions 3 and 4 on both sides. The support portion 5 comprises a plate-like thick root portion 5a which is connected to the horn body 2 and projects straight forward from the horn body 2, a plated-like thin intermediate portion 5b which bends substantially at a right angle from the root portion 5a and extends toward the left end portion of the horn body 2 without contacting the horn body 2, a plate-like thick projecting portion 5c which bends from the intermediate portion 5b substantially at a right angle and projects forward, and a plate-like thick end portion 5d which bends from the projecting portion 5c substantially at a right angle and extends toward the center of the horn body 2 without contacting the intermediate portion 5b. The support portion 6 comprises a plate-like thick root portion 6a which is connected to the horn body 2 and projects straight backward from the horn body 2, a plated-like thin intermediate portion 6b which bends substantially at a right angle from the root portion 6a and extends toward the left end portion of the horn body 2 without contacting the horn body 2, a plate-like thick projecting portion 6c which bends from the intermediate portion 6b substantially at a right angle and projects backward, and a plate-like thick end portion 6d which bends from the projecting portion 6c substantially at a right angle and extends toward the center of the horn body 2 without contacting the intermediate portion 6b. The support portion 7 comprises a plate-like thick root portion 7a which is connected to the horn body 2 and projects straight forward from the horn body 2, a plated-like thin intermediate portion 7b which bends substantially at a right angle from the root portion 7a and extends toward the right end portion of the horn body 2 without contacting the horn body 2, a plate-like thick projecting portion 7c which bends from the intermediate portion 7b substantially at a right angle and projects forward, and a plate-like thick end portion 7d which bends from the projecting portion 7c substantially at a right angle and extends toward the center of the horn body 2 without contacting the intermediate portion 7b. The support portion 8 comprises a plate-like thick root portion 8a which is connected to the horn body 2 and projects straight backward from the horn body 2, a plated-like thin intermediate portion 8b which bends substantially at a right angle from the root portion 8a and extends toward the right end portion of the horn body 2 without contacting the horn body 2, a plate-like thick projecting portion 8c which bends from the intermediate portion 8b substantially at a right angle and projects backward, and a plate-like thick end portion 8d which bends from the projecting portion 8c substantially at a right angle and extends toward the center of the horn body 2 without contacting the intermediate portion 8b.

In FIG. 3, reference numeral 15 denotes a clamper which is attached to the support portions 5 to 8, made of a metal bar having a larger height than the vertical width of each of the support portions 5 to 8, and has a through hole 16 extending to the upper and lower surfaces, recess portions 17 and 18 which are formed in the upper and lower surface, larger than and concentric to the through hole 16 and a cut-away portion 19 formed in one side surface. The through hole 16 has a diameter larger than the outer diameter of the threaded portion of a bolt 22 shown in FIG. 4. The cut-away portions 19 store the end portions 5d to 8d of the support portions 5 to 8 to prevent the end portions 5d to 8d from becoming shaky in a vertical direction. The recess portion 18 stores the head portion of the bolt 22 shown in FIG. 4. The clampers 15 are fitted onto the respective end portions 5d to 8d by mating the cut-away portions with the end portions 5d to 8d from the outside but they are out of contact with the root portions 5a to 8a and the intermediate portions 5b to 8b. The clampers 15 may be mated with the support portions 5 to 8 in such a manner the clampers 15 do not fall off from the support portions 5 to 8 by their own weight when the horn body 2 is lifted by hand. If the clampers 15 fall off from the support portion 5 to 8 by their own weight, mating between the clampers 15 and the support portions 5 to 8 is the best.

How to carry out ultrasonic vibration bonding will be described hereinafter with reference to FIG. 4. The output end of the transducer 20 is connected coaxial to one end of the tool 1 by a headless screw 21. One end of the horn body 2 is brought into contact with the output end of the transducer 20 by this bonding. The transducer 20 generates the ultrasonic vibration of vertical waves having a predetermined frequency with electric energy received from an unshown ultrasonic wave generator and outputs it. The clampers 15 are fitted onto the respective support portions 5 to 8, and the bolt 22 is fastened into a screw hole formed in the under surface of the holder 25 around a cavity 26 from the recess portion 18 of the clamper 15 through the through hole 16 and the recess portion 17. The upper surface of the clamper 15 is brought into contact with the under surface of the holder 25 by this fastening. The tool 1 is held by the holder 25 at both sides in such a manner that it is suspended apart from the holder 25. The holder 25 is attached to a piston rod which is a vertically movable output portion of a pressure unit such as an air cylinder. The cavity 26 is formed in the under surface of the holder 25 as an escape for the bonding working portions 3 and 4. A plurality of members 28 and 29 to be bonded together are mounted on the mounting table 27 situated right below the bonding working portion 4 in such a manner that they are placed one upon the other. In this state, the holder 25 is moved down in a direction shown by an arrow Y by the operation of the air cylinder, the bonding working portion 4 and the mounting table 27 hold the members 28 and 29 to be bonded together by pressure, ultrasonic vibration output from the transducer 20 is transmitted to the tool 1, the bonding working portion 4 vibrates in a direction shown by an arrow X, the vibration is transmitted from the bonding working portion 4 to the members 28 and 29 to be bonded together, and the contact portions of the members 28 and 29 vibrate in a horizontal direction, activated and bonded together while they are pressed by the bonding working portion 4 and the mounting table 27.

Figure 25:
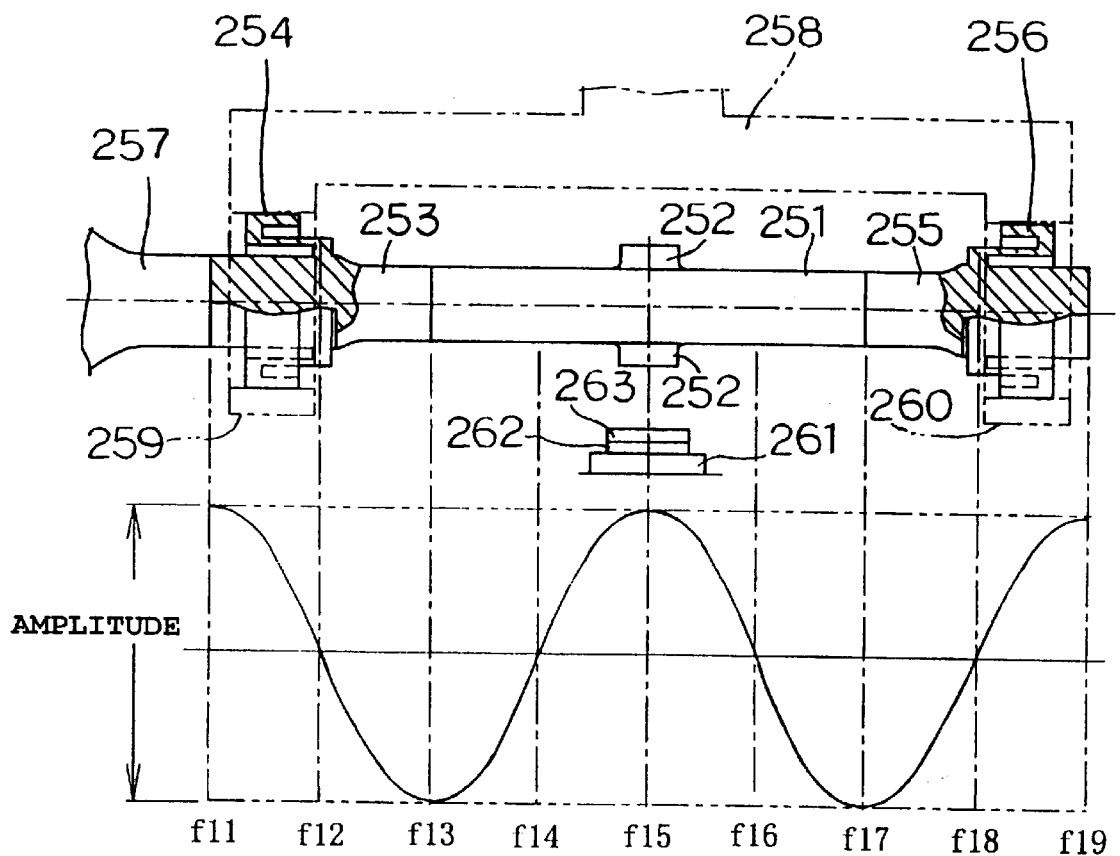
FIG. 25 is a diagram typically showing the support structure of a prior art tool by a holder.
Figure 26:
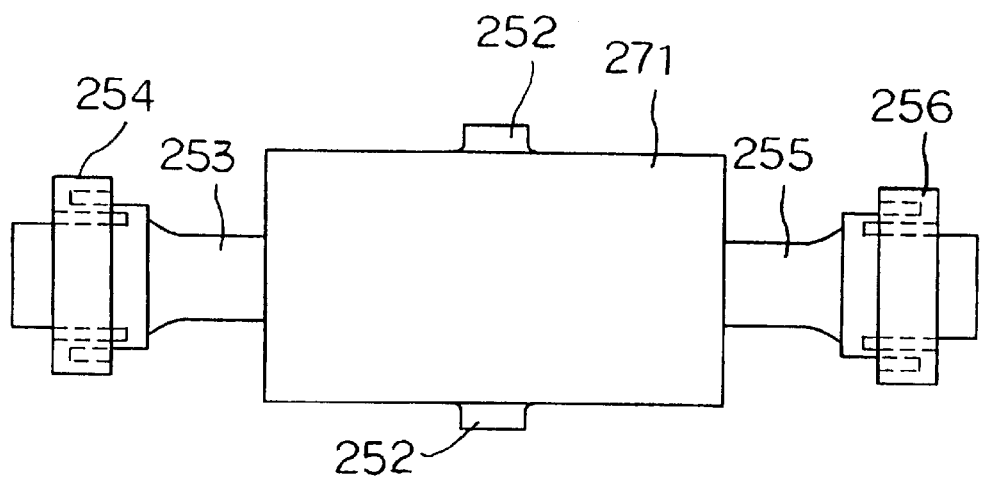
FIG. 26 is a diagram typically showing the support structure of another prior art tool by a holder.

According to the first embodiment of the present invention, the bonding working portions 3 and 4 are provided on the upper and lower surfaces of the square bar-like horn body 2 at the central maximum vibration amplitude point f3, and the support portions 5 to 8 are provided on the front and rear surfaces of the square bar-like horn body 2 at the closest two minimum vibration amplitude points f2 and f4 which are separate the same distance from the bonding working portions 3 and 4 on both sides. That is, the bonding working portions 3 and 4 are provided on two surfaces which are perpendicular to the surfaces on which the support portions 5 to 8 are provided of the square bar-like horn body 2. Therefore, when the support portions 5 to 8 are provided on the square bar-like horn body 2 at the closest two minimum vibration amplitude points f2 and f4 which are separate the same distance from the bonding working portions 3 and 4 on both sides, the support portions 5 to 8 do not narrow the working space for the members 28 and 29 to be bonded together, thereby making it possible to secure a wide working space. When the tool 1 is held by the holder 25 at both sides, the distance between the two support portions 5 and 7, that is, the support distance between the root portion 5a and the root portion 7a can be set equal to or shorter than the wavelength of resonance frequency. Therefore, the length of the tool 1 can be set to the wavelength of resonance frequency which is minimum when the tool 1 is held at both sides. As a result, when the bonding working potion 4 and the mounting table 27 hold the members 28 and 29 to be bonded together by pressure, the support distance of the tool 1 with respect to the holder 25 becomes shorter than the conventional support distance shown in FIG. 25 or FIG. 26 and the tool 1 is hardly bent.

Since the length of the tool 1 can be set to the wavelength of resonance frequency, the tool 1 becomes small in size and light in weight. For example, when the members 28 and 29 to be bonded together are a semiconductor chip and a circuit board and the semiconductor chip is mounted on the circuit board by ultrasonic vibration bonding, it is easy to control weight to be applied for bonding at the time of bonding even if weight to be applied for bonding is low because the number of bumps of the semiconductor chip is small. Even when the number of bumps of the semiconductor chip is large and weight to be applied for bonding is high, deflection which exerts a bad influence upon the surface mounting of the semiconductor chip on the circuit board does not occur in the tool 1 and all the bumps of the semiconductor chip and all the pads of the circuit board are properly bonded together because the support distance is set equal to or shorter than the wavelength of resonance frequency.

The support portions 5 to 8 project from the horn body 2 substantially like a letter S, and the root portions $5a$ to $8a$, the projecting portions $5c$ to $8c$ and the end portions $5d$ to $8d$ are made thick, but the intermediate portions $5b$ to $8b$ connecting the root portions $5a$ to $8a$ to the projecting portions $5c$ to $8c$ are made thin. That is, in the support portions 5 to 8, the intermediate portions $5b$ to $8b$ are parallel to the transmission direction of vibration and thinner than the root portions $5a$ to $8a$, the projecting portions $5c$ to $8c$ and the end portions $5d$ to $8d$. Therefore, even when the minimum vibration amplitude points f2 and f4 slightly dislocate from the root portions $5a$ to $8a$ and the root portions $5a$ to $8a$ vibrate by weight applied at the time of bonding, the intermediate portions $5b$ to $8b$ absorb vibration transmitted from the root portions $5a$ to $8a$ to the end portions $5d$ to $8d$. Accordingly, ultrasonic vibration generated by the transducer 20 can be transmitted from the tool 1 to the bonding working portions 3 and 4 efficiently and properly.

Since the head portion of the bolt 22 is stored in the recess portion 18 of the clamper 15, the bolt 22 does not project downward from the clamper 15. Therefore, the bolt 22 does not narrow the working space for the members to be bonded together.

Figure 5:
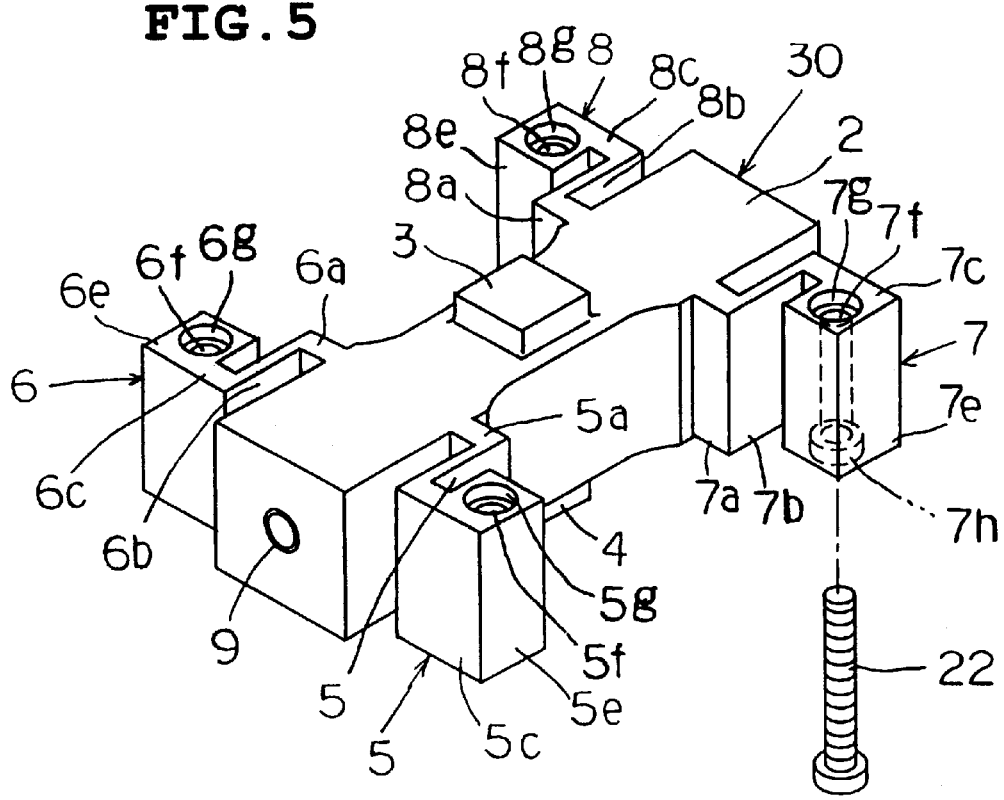
FIG. 5 is a perspective view of a tool according to a second embodiment of the present invention.
Figure 6:
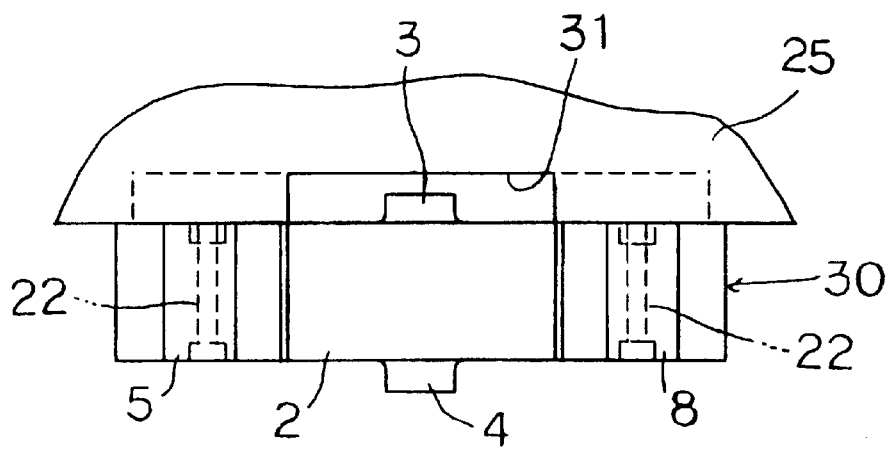
FIG. 6 is a sectional view showing the attachment of the tool of the second embodiment.

FIG. 5 and FIG. 6 show a second embodiment of the present invention. FIG. 5 shows the appearance of a tool 30 and FIG. 6 shows that the tool 30 is attached to the holder 25. This tool 30 is characterized by end portions $5e$ to $8e$ corresponding to the above end portions $5d$ to $8d$. The end portions $5e$ to $8e$ are formed like thicker plates than the end portions $5d$ to $8d$. Through holes $5f$ to $8f$ corresponding to the through holes 16 and recess portions $5g$ to $8g$ and $5h$ to $8h$ corresponding to the above recess portions 17 and 18 are formed in the respective end portions $5e$ to $8e$. A cavity 31 corresponding to the above cavity 26 is formed in the holder 25. The cavity 31 is large enough as an escape for the horn body 2, the bonding working portions 3 and 4, the root portions $5a$ to $8a$, the intermediate portions $5b$ to $8b$ and the projecting portions $5c$ to $8c$. As shown in FIG. 6, the bolts 22 are fastened into screw holes formed in the under surface of the holder 25 around the cavity 31 from the recess portions $5h$ to $8h$ through the through holes $5f$ to $8f$, whereby the upper surfaces of the end portions $5e$ to $8e$ are brought into contact with the lower surface of the holder 25, and the tool 30 is held by the holder 25 at both sides with the four support portion 5 to 8 in a suspended manner without contact between the holder 25 and the horn body 2, the bonding working portions 3 and 4, the root portions 5a to 8a, the intermediate portions 5b to 8b and the projecting portions 5c to 8c. According to the structure of this second embodiment, since the end portions 5e to 8e are fastened to the holder 25 by the bolts 22, the clampers 15 shown in FIG. 3 can be omitted and the attachment work of the tool 30 to the holder 25 becomes simple. In FIG. 5, the recess portions 5h, 6h and 8h are not illustrated but the same as the recess portion 7h. The horn body 2, the bonding working portions 3 and 4, the root portions 5a to 8a, the intermediate portions 5b to 8b, the projecting portions 5c to 8c, and the screw holes 9 and 10 are the same as in the first embodiment.

The tools 1 and 30 of the above embodiments are as long as the wavelength of resonance frequency but may be a multiple of the wavelength.

In FIG. 4, the transducer 20 is directly connected to one end of the tool 1. However, a booster as long as the half of the wavelength or a multiple of the half of the wavelength of resonance frequency may be attached to both ends of the tool 1, and the transducer 20 may be connected coaxial to one end of one of the boosters. That is, the transducer 20 may be connected to one end of the tool 1 through the booster.

In FIG. 4, the cavity 26 is formed to prevent the bonding working portion 3 from being contacted to the holder 25. When the thickness L of the clamper 15 from the cut-away portion 19 shown in FIG. 3 is set larger than the height of the bonding working portion 3, the cavity 26 can be omitted.

Figure 7:
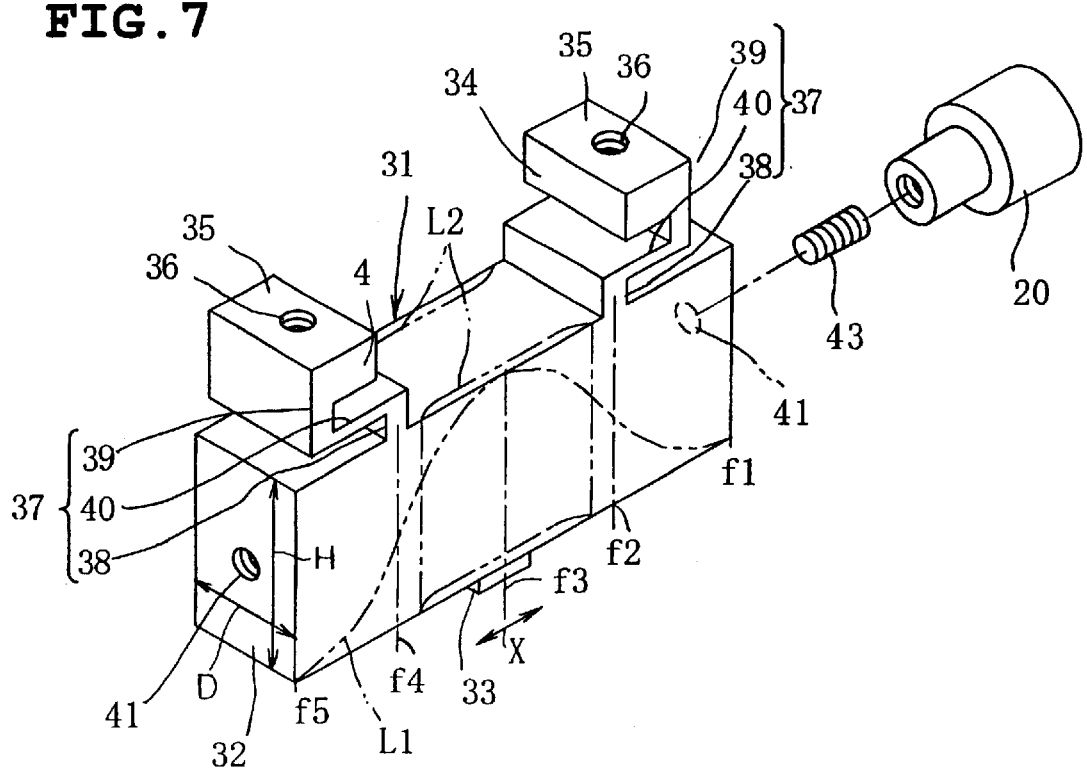
FIG. 7 is a perspective view of a tool according to a third embodiment of the present invention.

FIG. 7 shows a tool 31 according to a third embodiment of the present invention. In FIG. 7, the tool 31 is formed as a single body which is made from a material having excellent acoustic characteristics such as an aluminum or titanium alloy or hardened iron and comprises a horn body 32, a bonding working portion 33, support portions 34, connection portions 37 and screw holes 41. The horn body 32 is shaped like a bar having a length equal to the wavelength of resonance frequency of ultrasonic vibration transmitted from the transducer 20 (length from the maximum vibration amplitude point fl to the maximum vibration amplitude point f5). The vertical width H of the horn body 32 is larger than the transverse width D thereof. The bonding working portion 33 projects outward from the horn body 32 at the central maximum vibration amplitude point f3 of the horn body 32 but may be flush with or depressed inward from the exterior surface of the horn body 32.

The support portions 34 are provided on the horn body 32 asymmetrical about the vibration direction X of the horn body 32 as a linear symmetry axis. That is, the support portions 34 are arranged on the same side of the horn body 32 and the top surfaces of the support portions 34 are formed as flat attachment surfaces 35 parallel to the bonding working portion 33. Attachment holes 36 are used to attach the tool 31 to a holder 71 shown in FIG. 13 and formed as screw holes formed in the support portions 34 from the attachment surfaces 35 toward the horn body 32. The connection portions 37 are used to connect the horn body 32 to the attachment portions 34 without contact and shaped like a crank comprising a thick root portion 38, thick end portion 39 and thin intermediate portion 40. The crank shapes of the connection portions 37 are bisymmetrical to each other and the right and left portions may face the same direction. The root portions 38 are shaped like a plate which projects straight outward from the horn body 32 in a direction perpendicular to the vibration direction X of the horn body 32 at the minimum vibration amplitude points f2 and f4 which are separate the same distance from the bonding working portion 33 on both right and left sides. The end portions 39 are shaped like a plate which projects straight from one end of the attachment portion 34 in a direction perpendicular to the vibration direction X of the horn body 32. The intermediate portions 40 connect the root portions 38 and the end portions 39 and are shaped like a plate parallel to the vibration direction X of the horn body 32. The screw holes 41 are attachment holes for attaching the transducer 20 or unshown booster to the horn body 32 by a headless screw 43 and formed in center portions of the right and left end surfaces of the horn body 32.

Figure 8:
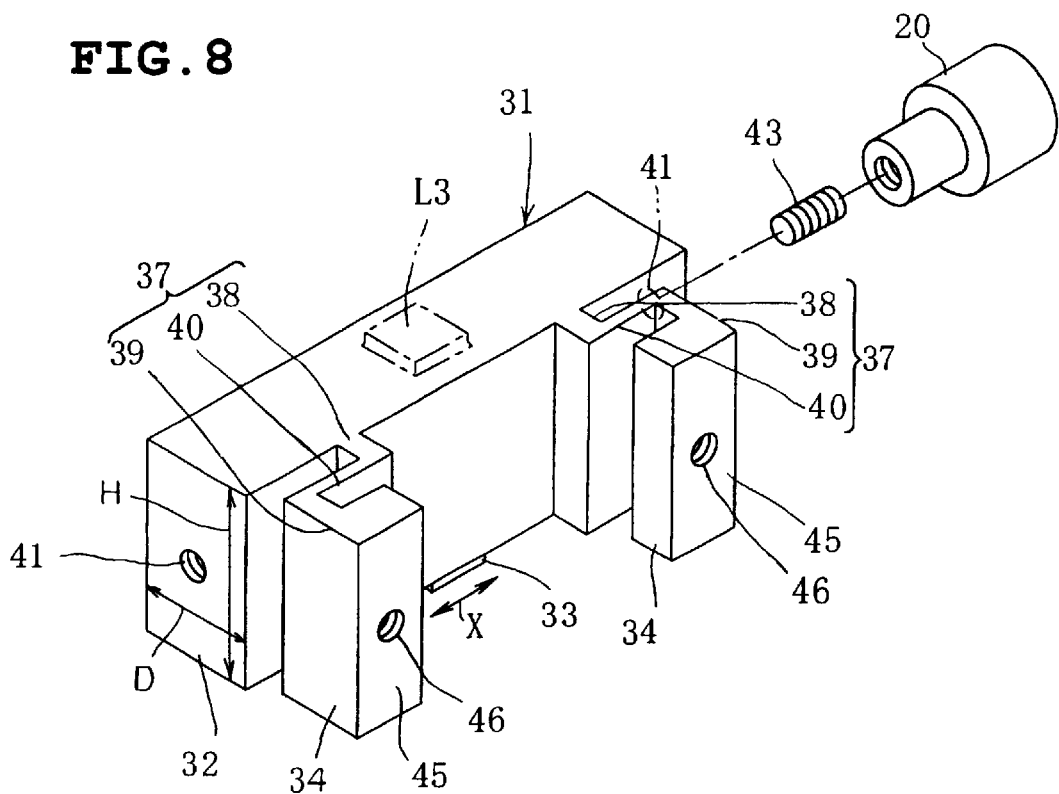
FIG. 8 is a perspective view of a tool according to a fourth embodiment of the present invention.

FIG. 8 shows a tool 31 according to a fourth embodiment of the present invention. The tool 31 of the fourth embodiment differs from the tool 1 of the first embodiment in the positions of the support portions 34, attachment surfaces 45 and attachment holes 46. That is, the support portions 34 of the fourth embodiment are arranged sideways with respect to the bonding working portion 33 in the fourth embodiment whereas the support portions 34 are arranged on a side opposite to the bonding working portion 33 in the third embodiment. The attachment surfaces 45 corresponding to the attachment surfaces 35 are formed in a direction perpendicular to the bonding working portion 33 and the attachment holes 46 corresponding to the attachment holes 36 are formed in a direction parallel to the bonding working portion 33.

Figure 9:
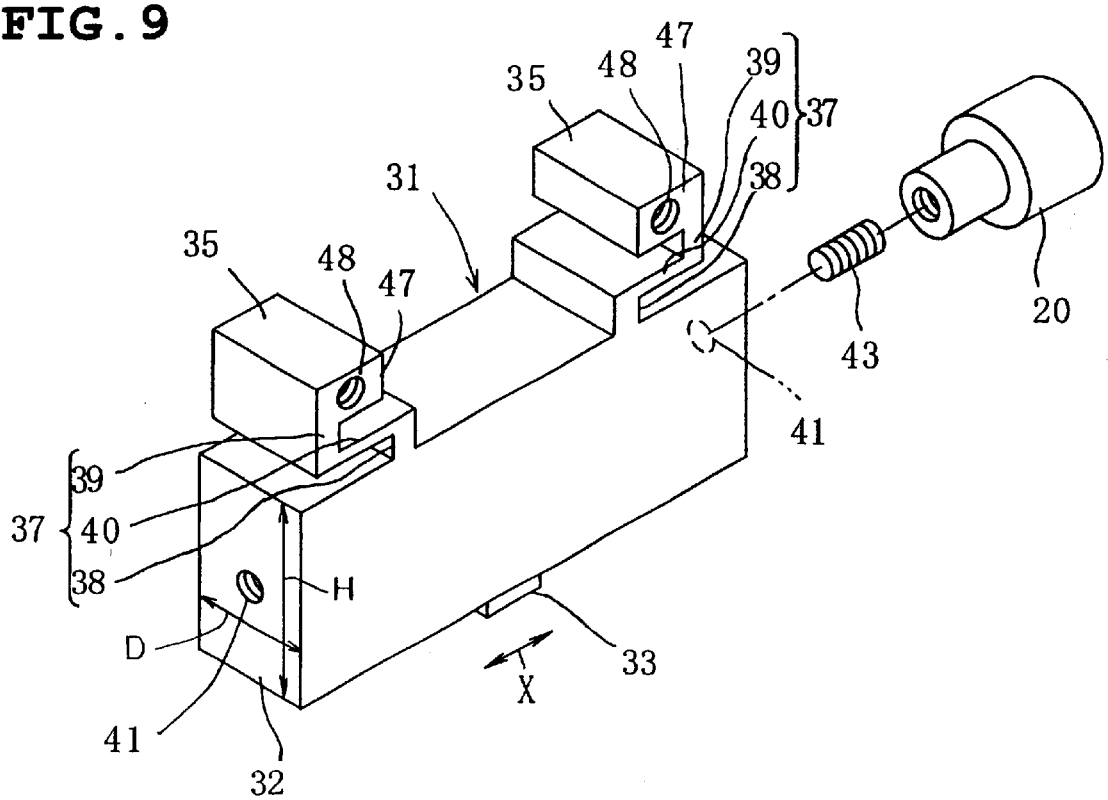
FIG. 9 is a perspective view of a tool according to a fifth embodiment of the present invention.

FIG. 9 shows a tool 31 according to a fifth embodiment of the present invention. The tool 31 of the fifth embodiment differs from the tool 31 of the third embodiment in the positions of attachment surfaces 47 and attachment holes 48. That is, the attachment surfaces 47 corresponding to the above attachment surfaces 35 are formed in a direction perpendicular to the bonding working portion 33 and the attachment holes 48 corresponding to the above attachment holes 36 are formed in a direction parallel to the bonding working portion 33. The attachment holes 48 may be the screw holes of the third embodiment or through holes.

Figure 10:
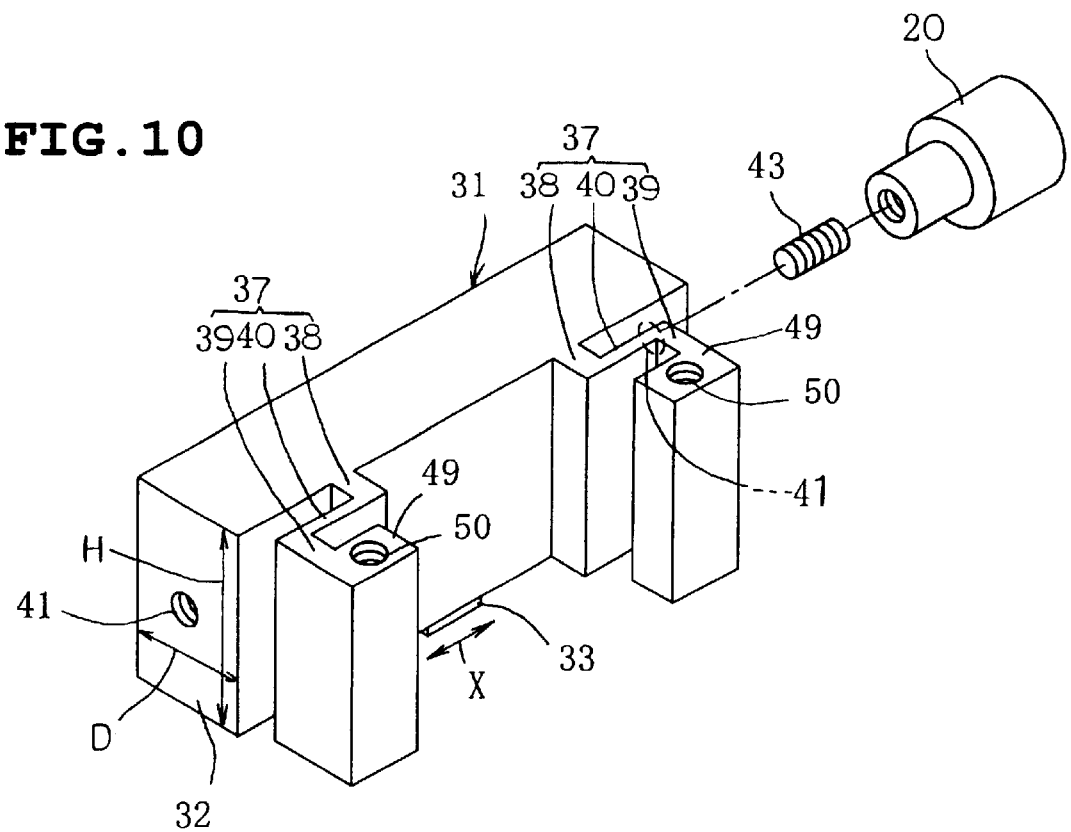
FIG. 10 is a perspective view of a tool according to a sixth embodiment of the present invention.

FIG. 10 shows a tool 31 according to a sixth embodiment of the present invention. The tool 31 of the sixth embodiment differs from the tool 31 of the fourth embodiment in the positions of attachment surfaces 49 and attachment holes 50. That is, the attachment surfaces 49 corresponding to the above attachment surfaces 45 are formed in a direction parallel to the bonding working portion 33 and the attachment holes 50 corresponding to the attachment holes 46 is formed in a direction perpendicular to the bonding working portion 33. The attachment holes 50 may be the screw holes of the fourth embodiment or through holes.

Figure 11:
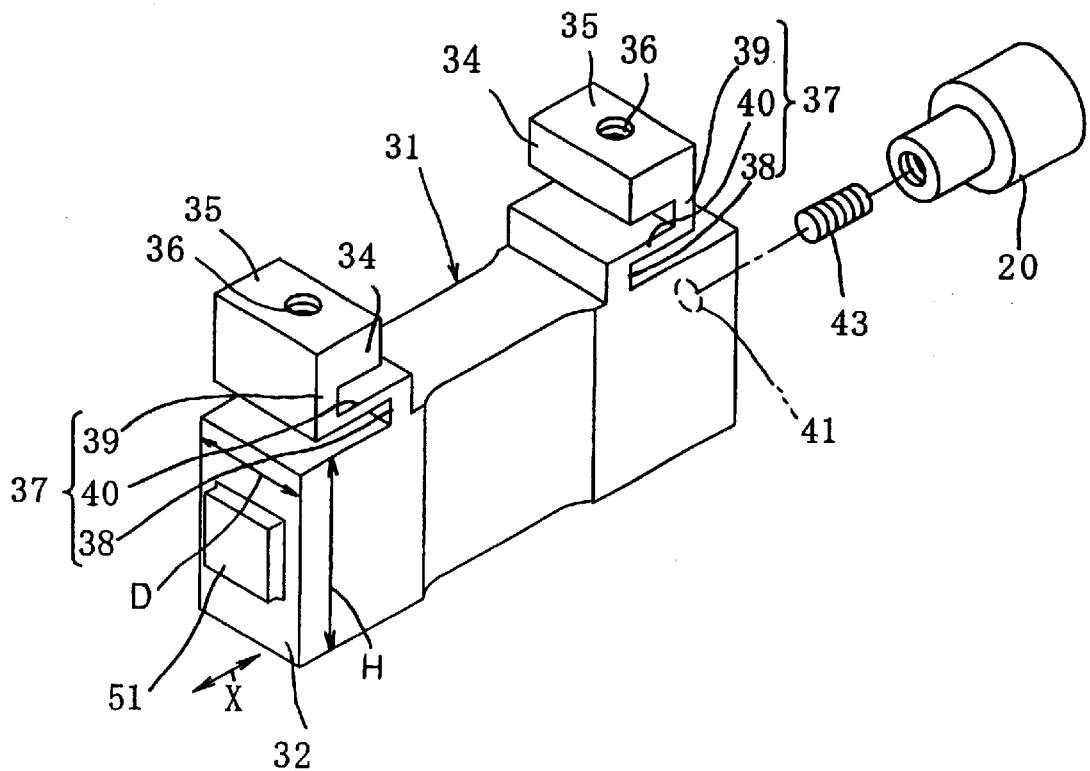
FIG. 11 is a perspective view of a tool according to a seventh embodiment of the present invention.

FIG. 11 show a tool 31 according to a seventh embodiment of the present invention. The tools 31 of the third to sixth embodiments are used when the members to be bonded together are metals whereas the tool 31 of the seventh embodiment is used when the members to be bonded together are synthetic resins. Therefore, the tool 31 of the seventh embodiment differs from the tools 31 of the third to sixth embodiments in the position of a bonding working portion 51. That is, in the tool 31 of the seventh embodiment, the bonding working portion 51 is provided on one end surface devoid of one screw hole 41 of the tool 31 of the third embodiment. The bonding working portion 51 may be flush with or depressed inward from one end surface of the horn body 32.

Figure 12:
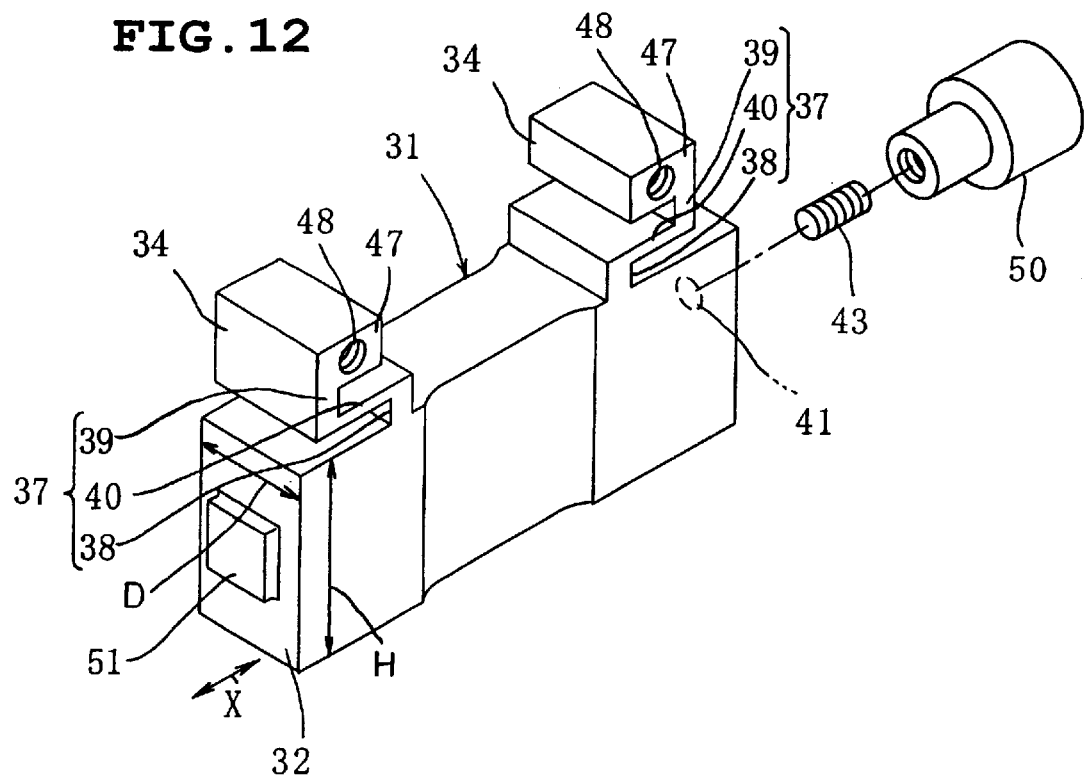
FIG. 12 is a perspective view of a tool according to an eighth embodiment of the present invention.

FIG. 12 shows a tool 31 according to an eighth embodiment of the present invention. The tool 31 of the eighth embodiment is used when the members to be bonded together are synthetic resins like the seventh embodiment but differs from the tool 31 of the seventh embodiment in the positions of the attachment surfaces 47 and the attachment holes 48. That is, in the tool 31 of the eighth embodiment, the bonding working portion 51 is provided on one end surface devoid of one screw hole 41 of the tool 31 of the fifth embodiment.

Figure 13:
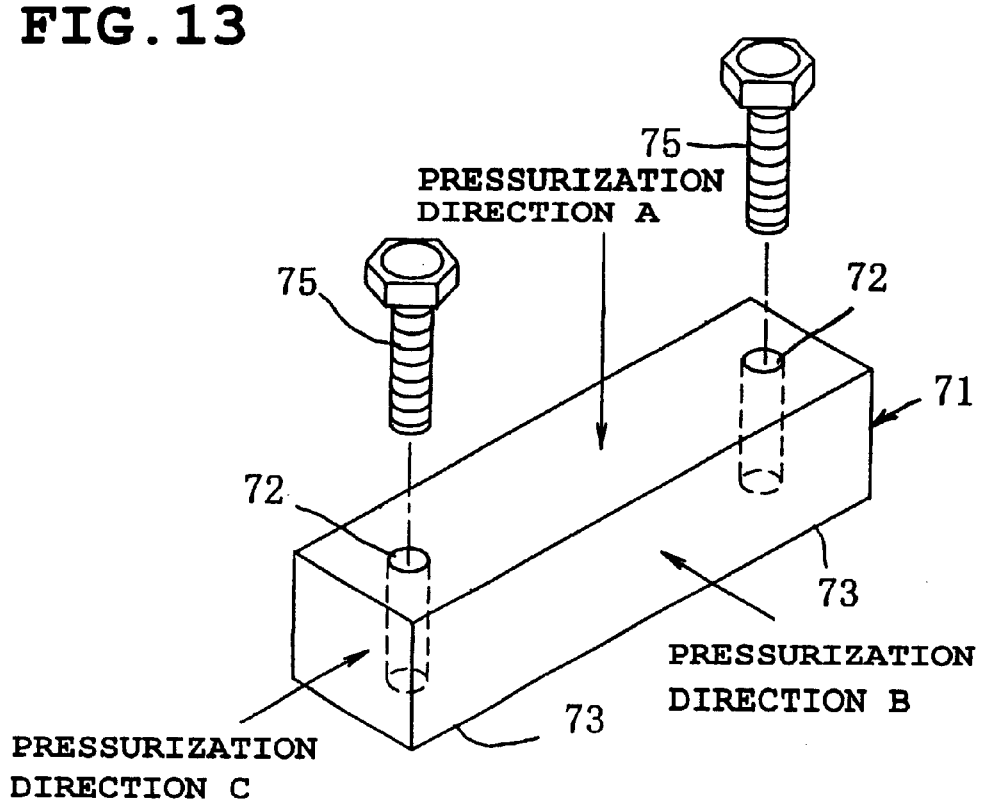
FIG. 13 is a perspective view showing the front side of a holder according to a ninth embodiment of the present invention.
Figure 14:
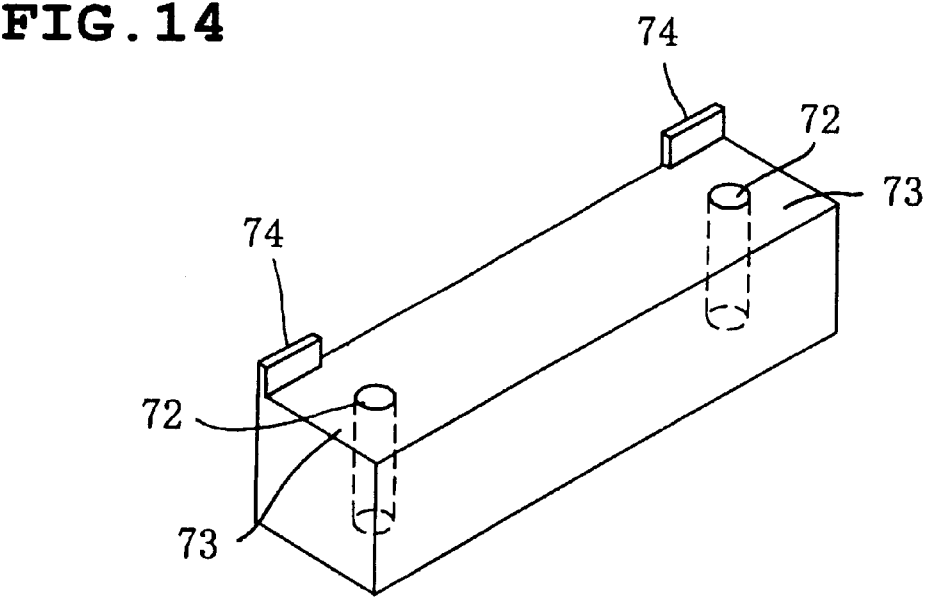
FIG. 14 is a perspective view showing the rear side of the holder of the ninth embodiment.

FIG. 13 and FIG. 14 show a holder 71 according to a ninth embodiment of the present invention. In FIG. 13, the holder 71 has a pair of attachment holes 72 in both bar-like end portions and is moved in one of pressurization directions A, B and C by an air cylinder 84 which is the pressure unit of an ultrasonic vibration bonding apparatus 81 shown in FIG. 15. The distance between the pair of attachment holes 72 is the same as the distance between the pair of attachment holes 36, 46, 48 or 50 of the tool 31 shown in FIGS. 7 to 12. As shown in FIG. 14, the under surface around the attachment holes 72 of the holder 71 is formed as a flat attachment surface 73 and positioning portions 74 are formed on the side portion of the attachment surface 73. The pressurization direction A is generated in the holder 71 by connecting a piston rod 85 which is the output end of the pressure unit shown in FIG. 15 to the top surface of the holder 71, the pressurization direction B is generated in the holder 71 by connecting the piston rod 85 shown in FIG. 15 to the side surface of the holder 71, and the pressurization direction C is generated in the holder 71 by connecting the piston rod 85 shown in FIG. 15 to the end surface of the holder 71.

Figure 15:
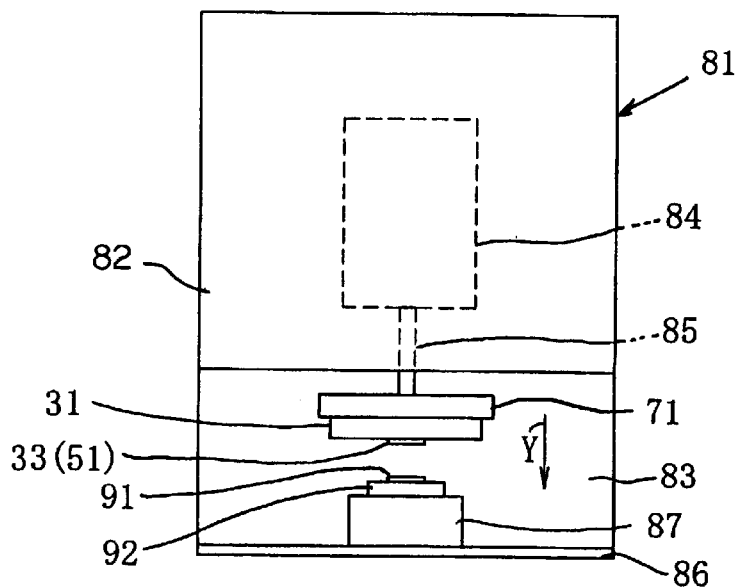
FIG. 15 is a front view of an ultrasonic vibration bonding apparatus according to a tenth aspect of the present invention.

FIG. 15 shows the ultrasonic vibration bonding apparatus 81 according to a tenth embodiment of the present invention. In FIG. 15, an apparatus body 82 has a working space 83 which is open in front, left and right directions in its front lower portion and the air cylinder 84 as a pressure unit in its upper inner portion for defining a portion above the working space 83. The lower end of the piston rod 85 which projects downward from the air cylinder 84 is arranged in the working space 83. The holder 71 shown in FIG. 13 is attached to the lower end of the piston rod 85 arranged in the working space 83 and the tool 1 of FIG. 7 to FIG. 12 is installed on the holder 71. The lower portion of the apparatus body 82 for defining a portion behind the working space 83 is installed on a batholith 86 which constitutes a base for setting the ultrasonic vibration bonding apparatus 81 in a production line or the like. A mounting table 87 is installed on the top surface of the batholith 86 for defining a portion below the working space 83.

How to carry out ultrasonic vibration bonding when the tool 31 of the third to eighth embodiments and the holder 71 of the ninth embodiment are used in the ultrasonic vibration bonding apparatus 81 of the tenth embodiment will be described hereinafter. When the tool 31 of the third embodiment or the sixth embodiment is used, the upper surface which is the pressurization direction A of the holder 71 shown in FIG. 13 is connected to the lower end of the piston rod 85 shown in FIG. 15. In this case, the piston rod 85 is arranged at the center between the attachment holes 72 shown in FIG. 13, the attachment holes 72 shown in FIG. 13 are disposed in a vertical direction which is parallel to the vertical movement direction of the piston rod 85 shown in FIG. 15, and the attachment surface 73 shown in FIG. 13 is set parallel to the flat top surface of the mounting table 87 shown in FIG. 15.

In this state, the attachment surfaces 35 shown in FIG. 7 or the attachment surfaces 49 shown in FIG. 10 are placed under the attachment surface 73 shown in FIG. 13, the attachment portions 34 shown in FIG. 7 or FIG. 10 are butted against the positioning portions 74 shown in FIG. 14, and the attachment holes 36 shown in FIG. 7 or the attachment holes 50 shown in FIG. 10 are aligned with the attachment holes 72 shown in FIG. 13. Bolts 75 shown in FIG. 13 fasten the holder 71 shown in FIG. 13 to the attachment portions 34 shown in FIG. 7 or FIG. 10 through the attachment holes 72 and the attachment holes 36 shown in FIG. 7 or the attachment holes 50 shown in FIG. 10. Thereby, the bonding working portion 33 of the tool 31 shown in FIG. 7 or FIG. 10 becomes parallel to the top surface of the mounting table 87 shown in FIG. 15, and the top surface of the mounting table 87 is located right below the bonding working portion 33. The tool 31 shown in FIG. 7 or FIG. 10 and the transducer 20 are connected to each other by the headless screw 43. One end of the horn body 32 and the output end of the transducer 20 are contacted to each other by this connection.

When the tool 31 of the fourth embodiment or the fifth embodiment is used, the lower end of the piston rod 85 shown in FIG. 15 is attached to the front surface or rear surface which is the pressurization direction B of the holder 71 shown in FIG. 13 such that it is situated at the center between the attachment holes 72, the attachment holes 72 shown in FIG. 13 are arranged in a direction perpendicular to the vertical movement direction of the piston rod 85 shown in FIG. 15, and the attachment surface 73 shown in FIG. 13 is set perpendicular to the top surface of the mounting table 87 shown in FIG. 15. In this state, the attachment surfaces 45 shown in FIG. 8 or the attachment surfaces 47 shown in FIG. 9 are placed under the attachment surface 73 shown in FIG. 13, the bolts 75 shown in FIG. 13 fasten the holder 71 shown in FIG. 13 to the support portions 34 shown in FIG. 8 or FIG. 9 through the attachment holes 72 and the attachment holes 46 shown in FIG. 8 or the attachment holes 48 shown in FIG. 9. Thereby, the bonding working portion 33 of the tool 31 shown in FIG. 8 or FIG. 9 becomes parallel to the top surface of the mounting table 87 shown in FIG. 15, and the top surface of the mounting table 87 is located right below the bonding working portion 33. The tool 31 shown in FIG. 8 or FIG. 9 and the transducer 20 are connected to each other by the headless screw 43 like the above tool 31.

Thereafter, a plurality of members 91 and 92 to be bonded together which are made from metals are mounted on the mounting table 87 in such a manner that they are placed one upon the other. In this state, the holder 71 is moved down in a direction shown by the arrow Y in FIG. 15 by the operation of the air cylinder 84, the bonding working portion 33 and the mounting table 87 hold the members 91 and 92 to be bonded together by pressure, ultrasonic vibration output from the transducer 20 is transmitted to the tool 31, the bonding working portion 33 vibrates in a direction shown by the arrow X, this vibration is transmitted from the bonding working portion 33 to the members 91 and 92 to be bonded together, and the contact surfaces of the members 91 and 92 vibrate in a horizontal direction and are activated and bonded together while they are pressed by the bonding working portion 33 and the mounting table 87.

When the tool 31 of the seventh embodiment or the eighth embodiment is used, the lower end of the piston rod 85 shown in FIG. 15 is attached to the end surface which is the pressurization direction C of the holder 71 shown in FIG. 13 such that it is situated at the center of the end surface, the attachment holes 72 shown in FIG. 13 are arranged in a direction perpendicular to the vertical movement direction of the piston rod 85 shown in FIG. 15, and the attachment surface 73 shown in FIG. 13 is set perpendicular to the top surface of the mounting table 87 shown in FIG. 15. In this state, the attachment surfaces 35 shown in FIG. 11 or the attachment surfaces 47 shown in FIG. 12 are placed under the attachment surface 73 shown in FIG. 13, the bolts 75 shown in FIG. 13 fasten the holder 71 shown in FIG. 13 to the support portions 34 shown in FIG. 11 or FIG. 12 through the attachment holes 72 and the attachment holes 36 shown in FIG. 11 or the attachment holes 48 shown in FIG. 12. Thereby, the bonding working portion 51 of the tool 31 shown in FIG. 11 or FIG. 12 becomes parallel to the top surface of the mounting table 87 shown in FIG. 15, and the top surface of the mounting table 87 is located right below the bonding working portion 51. The tool 31 shown in FIG. 11 or FIG. 12 and the transducer 20 are connected to each other by the headless screw 43 like the above tool 31.

Thereafter, a plurality of members 91 and 92 to be bonded together made from synthetic resins are mounted on the top of the mounting table 87 in such a manner that they are placed one upon the other. In this state, the holder 71 is moved down in a direction shown by the arrow Y in FIG. 15 by the operation of the air cylinder 84, the bonding working portion 51 and the mounting table 87 hold the members 91 and 92 to be bonded together by pressure, ultrasonic vibration output from the transducer 20 is transmitted to the tool 31, the bonding working portion 51 vibrates in a direction shown by the arrow X, this vibration is transmitted from the bonding working portion 51 to the members 91 and 92 to be bonded together, and the contact surfaces of the members 91 and 92 vibrate in a vertical direction and are bonded together while they are pressed by the bonding working portion 51 and the mounting table 87.

When the tool 31 is held by the holder 71 at both sides, the support distance between the root portion 38 and the other root portion 38 can be set equal to or shorter than the wavelength of resonance frequency. Therefore, the tool 31 becomes small in size and light in weight. For example, when the tool 31 of any one of the third to sixth embodiments is used, the members 91 and 92 to be bonded together are a semiconductor chip and a circuit board, and the semiconductor chip is surface mounted on the circuit board by ultrasonic vibration bonding, it is easy to control weight to be applied for bonding at the time of bonding even if weight to be applied for bonding is low because the number of bumps of the semiconductor chip is small. Even when the number of bumps of the semiconductor chip is large and weight to be applied for bonding is high, deflection which exerts a bad influence upon the surface mounting of the semiconductor chip on the circuit board does not occur in the tool 1 and all the bumps of the semiconductor chip and all the pads of the circuit board are properly bonded together because the support distance is set equal to or shorter than the wavelength of resonance frequency.

Since the thick root portions 38 and the thick end portions 39 of the connection portions 37 are connected to each other by the thin intermediate portions 40, the thin intermediate portions 40 absorb vibration transmitted from the root portions 38 toward the end portions 39 even when the positions of the minimum vibration amplitude points f2 and f4 of the tool 31 with respect to the root portions 38 shift from their theoretical positions and the root portions 38 vibrate by weight applied to the tool 31 at the time of bonding. Therefore, ultrasonic vibration generated by the transducer 20 can be transmitted from the tool 31 to the bonding working portion 33 or 51 efficiently and properly and not only the tool 31 but also the holder 71 and the cylinder piston 85 do not become shaky.

Figure 16A:
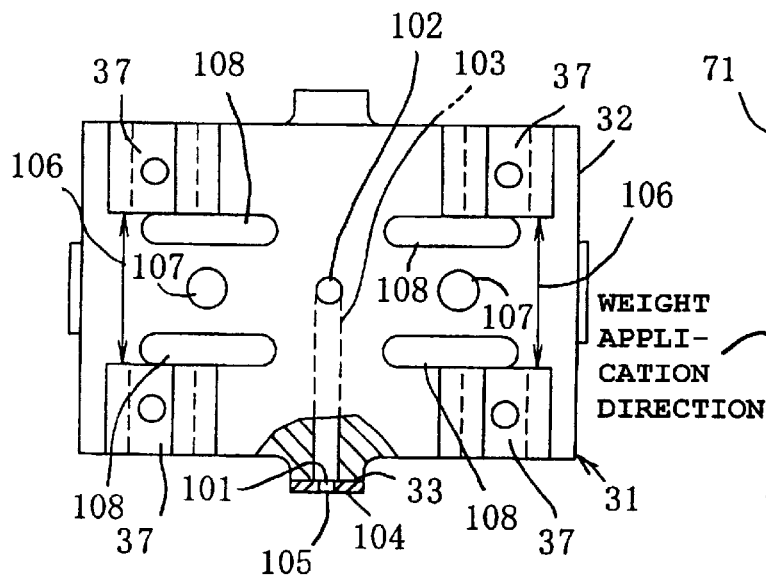
FIG. 16(a) is a front view of a tool according to an eleventh embodiment of the present invention.
Figure 16B:
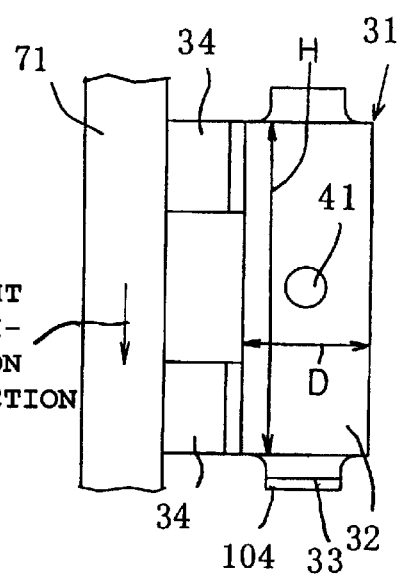
FIG. 16(b) is a side view thereof.

In the above third to tenth embodiments, a plurality of members to be bonded together are mounted on the mounting table 87 and then pressed by the bonding working portion 33 and the mounting table 87. As shown in FIG. 16(a), a suction hole 101 is formed in the bonding working portion 33 to adsorb one member 91 shown in FIG. 15 to the bonding working portion 33 by the suction operation of suction means, the other member 92 shown in FIG. 15 is placed on the mounting table 87, and the member 91 is placed upon the member 92 and pressed by the descent of the tool 31 caused by the downward movement of the air cylinder 84. In this eleventh embodiment, a hose connection portion 102 is formed on the exterior surface of the tool 31 and a suction passage 103 which communicates with the suction hole 101 and the hose connection portion 102 is formed in the tool 31. When the member 91 adsorbed to the bonding working portion 33 is as small as a semiconductor chip, a bonding chip 104 having a small suction hole 105 may be soldered to the bonding working portion 33. The connection portions 37 are divided by slits 106, heater holes 107 are formed at the minimum vibration amplitude potions f2 and f4 of the tool 31 (see FIG. 7), and the tool 31 is heated with an electric heater inserted into the heater holes 107, thereby making it possible to bond the plurality of members together by bonding energy generated by ultrasonic vibration and bonding energy generated by the electric heater. In this case, the slits 106 are used as an escape for the wiring of the electric heater. Cut-away portions 108 may be formed in the tool 31 to improve the balance of vibration. The tool 31 shown in FIG. 16(a) is installed as shown in FIG. 16(b).

A constriction shown by a virtual line L2 in FIG. 7 may be formed in the intermediate portion of the tool 31 situated between a pair of the root portions 38 to increase vibration amplitude.

A bonding working portion 33 shown by a virtual line L3 in FIG. 8 may be formed on the upper and lower surfaces of the tool 31.

Figure 17:
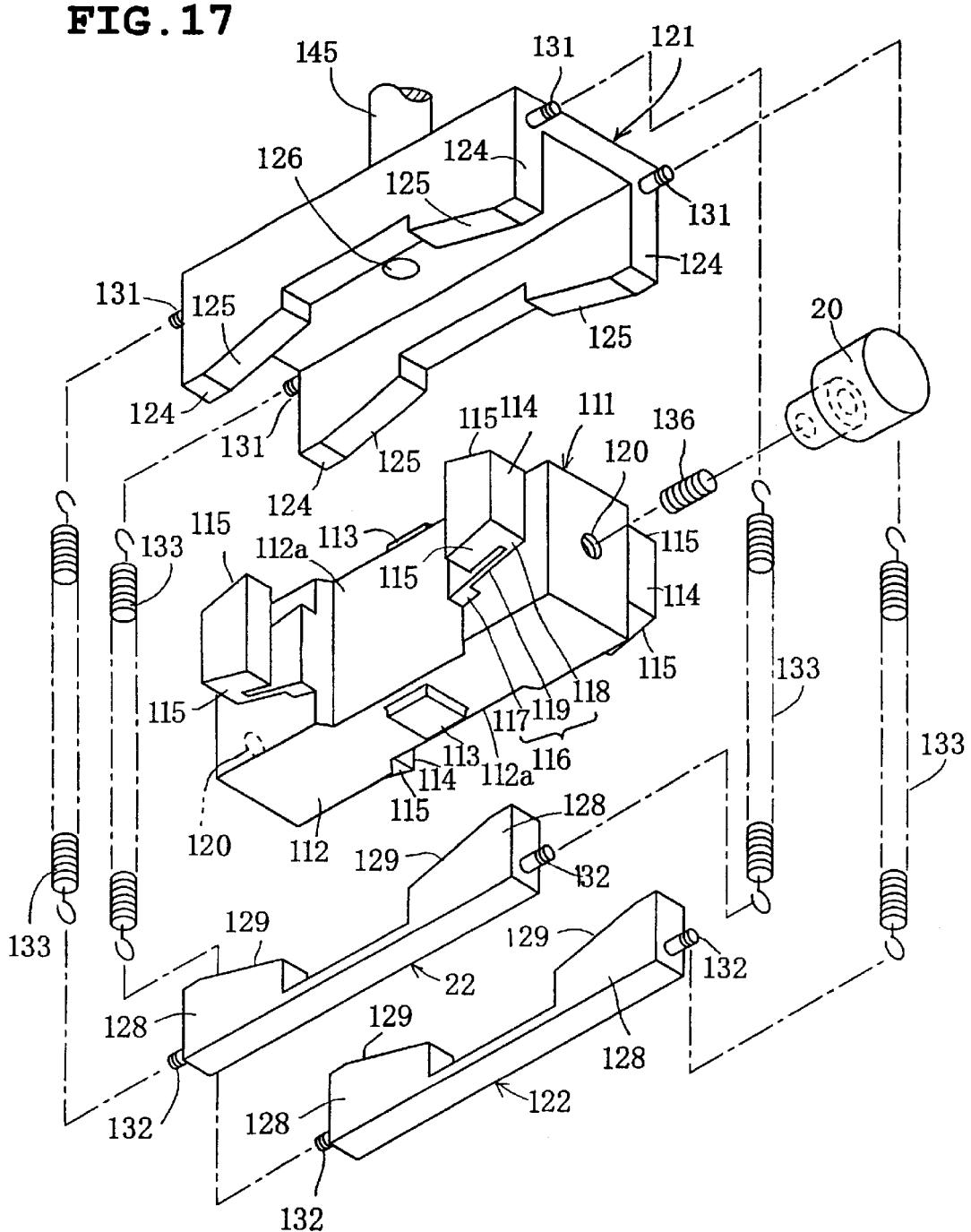
FIG. 17 is an exploded perspective view of a tool and a support unit according to a twelfth embodiment of the present invention.
Figure 18:
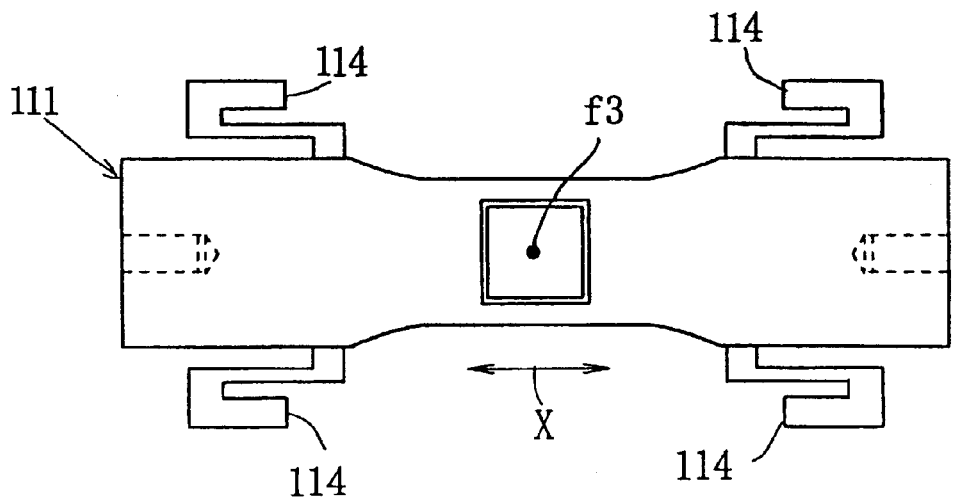
FIG. 18 is a top view of the tool of the twelfth embodiment.
Figure 19:
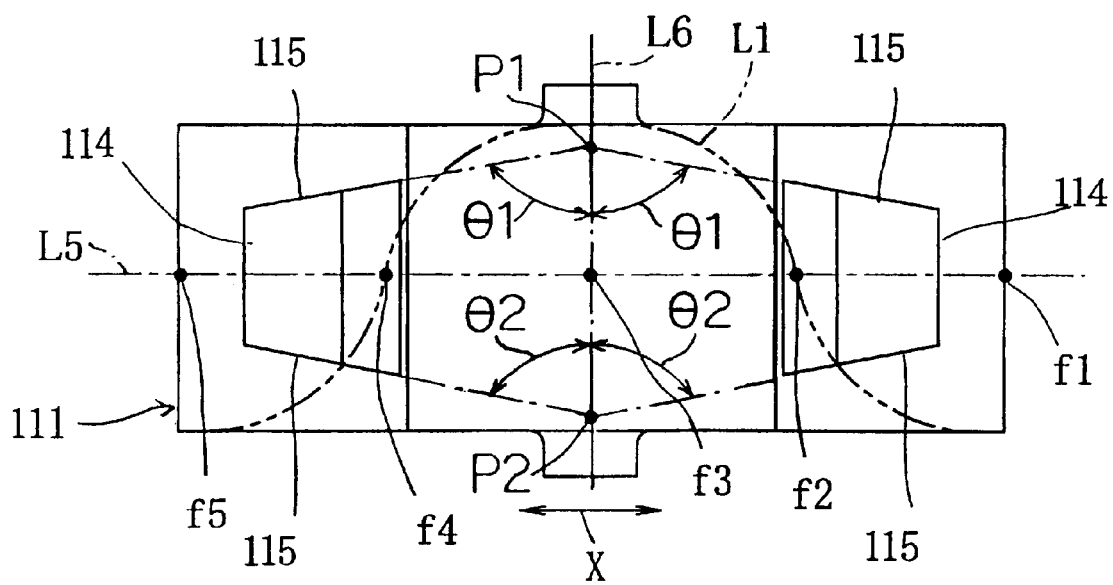
FIG. 19 is a front view of the tool of the twelfth embodiment.
Figure 20:
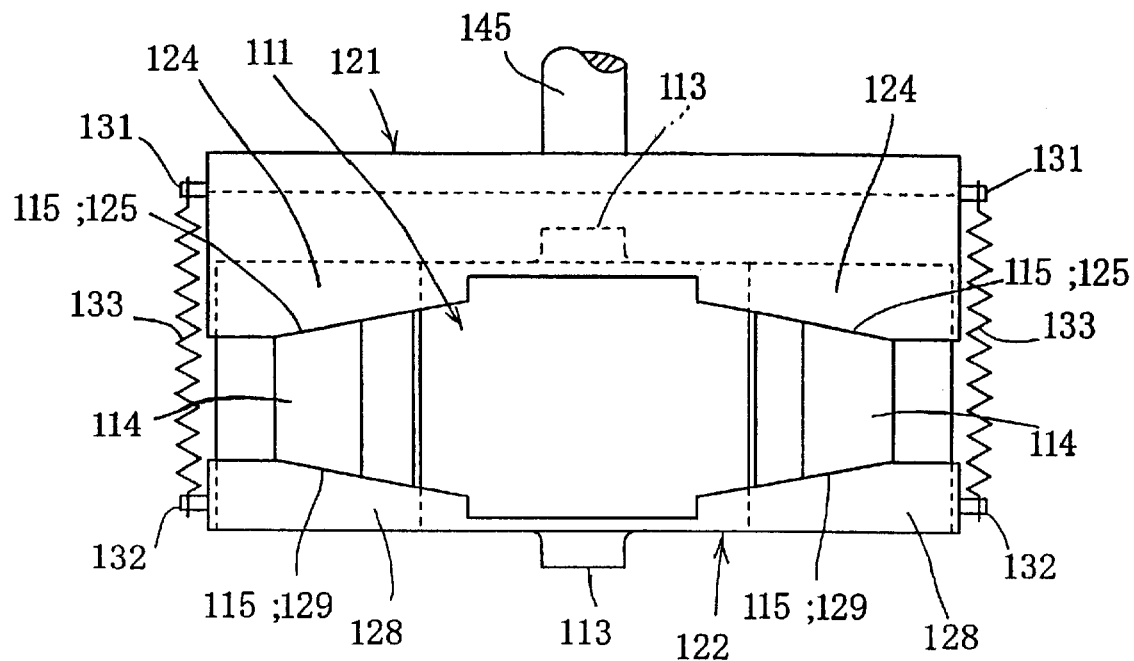
FIG. 20 is a front view of the assembly of the tool and support unit of the twelfth embodiment.
Figure 21:
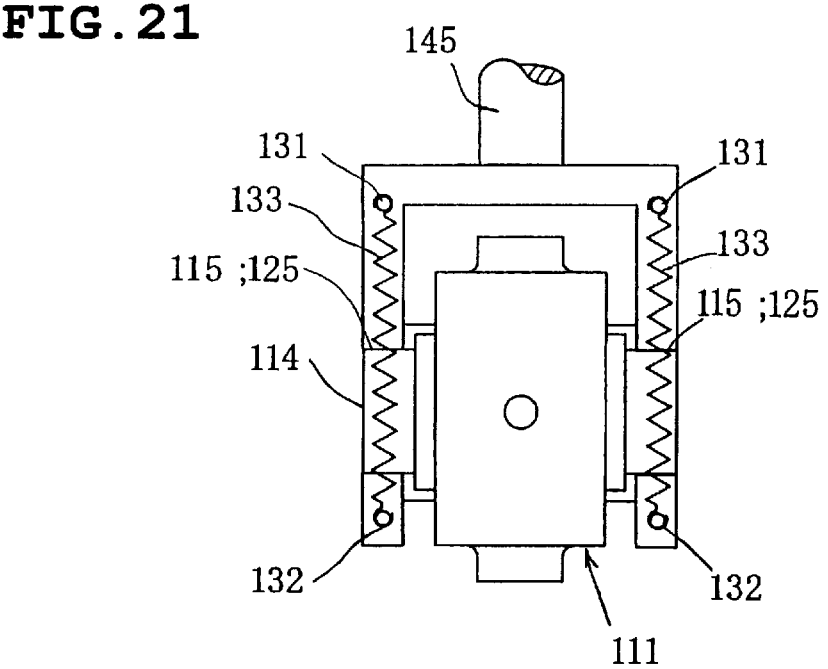
FIG. 21 is a right side view of the assembly of the tool and support unit of the twelfth embodiment.
Figure 22:
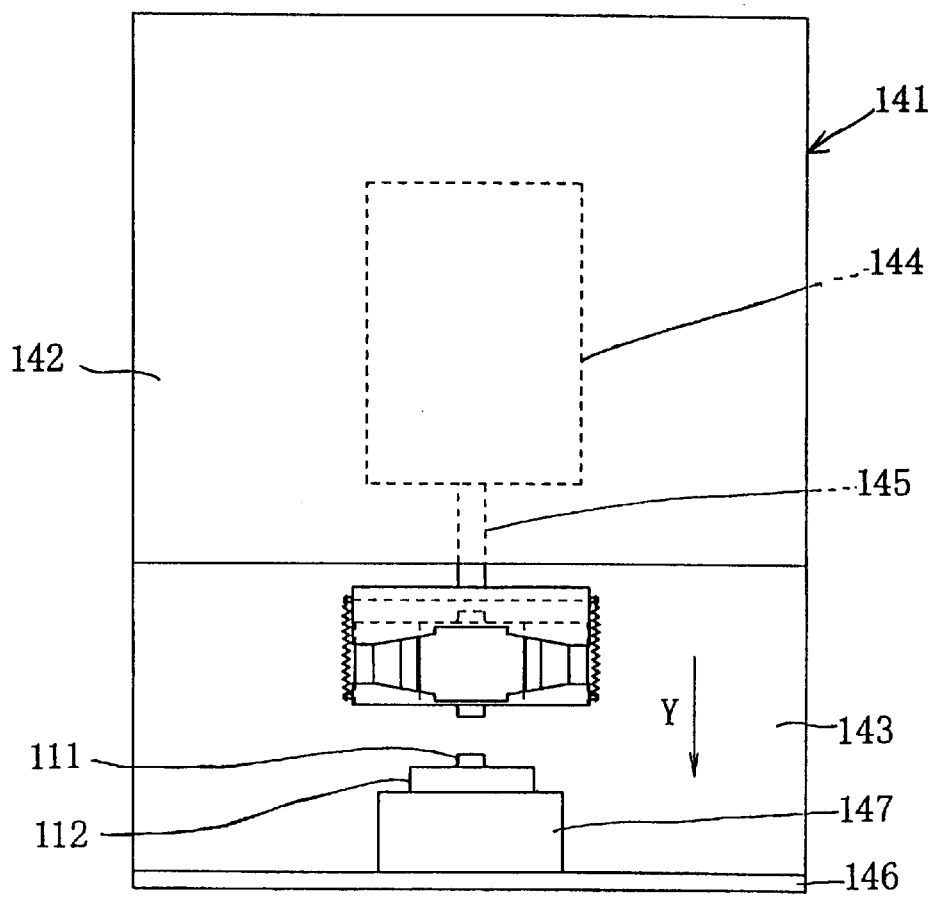
FIG. 22 is a front view of the ultrasonic vibration bonding apparatus of the twelfth embodiment.

FIGS. 17 to 22 show a twelfth embodiment of the present invention. FIG. 17 is an exploded view of a tool 111 and its support unit, FIG. 18 is a top view of the tool 111, FIG. 19 is a front view of the tool 111, FIG. 20 is a front view of the tool 111 supported by the support unit, FIG. 21 is a right side view of the tool 111 supported by the support unit and FIG. 22 is a front view of an ultrasonic vibration bonding apparatus.

The tool 111 and its support unit will be described hereinafter with reference to FIG. 17. In this twelfth embodiment, the tool 111 is formed as a single body which is made from a material having excellent acoustic characteristics such as an aluminum or titanium alloy or hardened iron and comprises a horn body 112, bonding working portions 113, support portions 114, slanting surfaces 115, connection portions 116, root portions 117, end portions 118, intermediate portions 119 and connection portions 120. The horn body 112 is shaped like a bar having a length equal to the wavelength of resonance frequency of ultrasonic vibration transmitted from the transducer 20 (length from the maximum vibration amplitude point f1 to the maximum vibration amplitude point f5). The connection portions 120 are screw holes, formed in the center portions of the right and left end surfaces of the horn body 112, for attaching the transducer 20 or an unshown booster coaxial to the tool 111 by a headless screw 136. Constrictions 112a are formed in the intermediate portion of the horn body 112 situated between the root portions 117 to increase vibration amplitude by the tool 111. The constrictions 11a may not be formed.

Upper and lower clampers 121 and 122 are separated from each other in such a manner that they can hold the support portions 114 from a vertical direction. The upper clamper 121 is formed as a single body which is made from an iron-based material and comprises grip portions 124, slanting surfaces 125 and a connection portion 126. The grip portions 124 project downward from the four corners of the upper clamper 121 at positions corresponding to the support portions 114. The under surfaces of the grip portions 124 are formed as the flat slanting surfaces 125 to be contacted to the upper slanting surfaces 115 of the support portions 114. The connection portion 126 is a screw hole, formed in the center of the upper clamper 121, for attaching the upper clamper 121 to the piston rod 145 of the air cylinder 144 as the pressure unit of the ultrasonic vibration bonding apparatus 141 shown in FIG. 22.

The lower clampers 122 consist of front and rear clampers each of which is formed as a single body which is made from an iron-based material and comprises grip portions 128 and slanting surfaces 129. The grip portions 128 of each of the lower clampers 122 project upward from the right and left end portions of the lower clamper 122 at positions corresponding to the support portions 114. The top surface of the grip portion 128 is formed as the flat slanting surface 129 to be contacted to the lower slanting surface 115 of the support portion 114.

The upper and lower clampers 121 and 122 are fitted with spring hook portions 131 and 132 for mooring elastic materials 133, respectively. The elastic materials 133 urge the upper and lower clampers 121 and 122 in a direction that they approach each other and are formed of coil springs. The upper ends of the elastic materials 133 are caught by the spring hook portions 131 of the upper clamper 121 and the lower ends of the elastic materials 133 are caught by the spring hook portions 132 of the lower clampers 122, whereby the elastic materials 133 connect the upper clamper 121 to the lower clampers 122.

With reference to FIG. 18 and FIG. 19, details of the tool 111 will be described hereinafter. The bonding working portions 113 are arranged on the exterior surfaces of the horn body 112 at the position of the central maximum vibration amplitude point f3 of the horn body 112 and the support portions 114 are arranged on the exterior surfaces of the horn body 112 at the positions of the minimum vibration amplitude points f2 and f4 which are separate the same distance from the maximum vibration amplitude point f3 on both sides. The bonding working portions 113 are provided on the upper and lower surfaces of the horn body 112 and the support portions 114 are provided on the front and rear surfaces of the horn body 112 so that the surfaces of the bonding working portions 113 are perpendicular to the surfaces of the support portions 114. The bonding working portions 113 may be flush with the upper and lower surfaces or depressed from the upper and lower surfaces of the horn body 112. If they project from the upper and lower surfaces of the horn body 112, it is optimum because the bonding working portions 113 contact products to be bonded together and surfaces around the bonding working portions 113 of the horn body 112 do not contact the products when the products to be bonded together are thin. The virtual line L1 shows a waveform indicating the displacement of vibration amplitude.

The support portions 114 are provided on the horn body 112 symmetrical about a linear symmetry axis L5 parallel to the vibration direction X of the tool 111. That is, the support portions 114 are arranged on front and rear and right and left surfaces of the horn body 112 symmetrical to each other and the upper and lower surfaces of the support portions 114 are formed into the flat slanting surfaces 115 with respect to the bonding working portions 113 as attachment surfaces. The connection portions 116 connect the horn body 112 to the support portions 114 without contact and are shaped like a crank comprising a root portion 117, an end portion 118 and an intermediate portion 119. The bonding working portions 113 have a flat surface parallel to the vibration direction X. The upper right and left slanting surfaces 115 cross each other at a certain point P1 on a perpendicular L6 passing through the minimum vibration amplitude point f3 and angles θ1 formed by the perpendicular L6 and the upper right and left slanting surfaces 115 are the same. The lower right and left slanting surfaces 115 cross each other at another point P2 on the perpendicular L6 and angles θ2 formed by the lower right and left slanting surfaces 115 and the perpendicular L6 are the same. The perpendicular L6 is perpendicular to the linear symmetry axis L5.

The crank shapes of the connection portions 116 are symmetrical in front and rear directions and right and left directions but both of the right and left connection portions 116 may face the same direction. The root portions 117 are shaped like a thick plate which projects straight outward in a direction perpendicular to the vibration direction X from the horn body 112 at the positions of the minimum vibration amplitude points f2 and f4 which are separate the same distance from the bonding working portion 113 on both sides. The end portions 118 are shaped like a thick plate which project straight from one end of the support portion 114 in a direction perpendicular to the vibration direction X. The intermediate portions 119 connect the root portions 117 and the end portions 118 and are shaped like a thin plate parallel to the vibration direction X.

How to set the tool 111 on the upper and lower clampers 121 and 122 will be described hereinafter. First, the upper clamper 121 is turned upside down from the state shown in FIG. 17 and mounted on an unshown working table. That is, the upper clamper 121 mounted on the working table is arranged such that the four grip portions 124 face up. In this state, the tool 111 is turned upside down from the state shown in FIG. 17 and the slanting surfaces 115 of the four support portions 114 are placed upon the slanting surfaces 125 of the four grip portions 124 of the upper clamper 121. While the four support portions 114 are placed upon the four grip portions 124, the bonding working portions 113 and the connection portions 116 of the tool 111 are not in contact with the upper clamper 121.

Thereafter, the two lower clampers 122 are turned upside down from the state shown in FIG. 17 and the slanting surfaces 129 of the grip portions 128 of the two lower clampers 122 are placed upon the slanting surfaces 115 of the four support portions 114 of the tool 111. While the four grip portions 128 are placed upon the four support portions 114, the bonding working portions 113 and the connection portions 116 of the tool 111 are not in contact with the lower clampers 122.

Further, while the support portions 114 of the tool 111 are placed upon the grip portions 124 of the upper clamper 121, the grip portions 128 of the lower clampers 122 are placed upon the support portions 114 of the tool 111, the slanting surfaces 125 of the upper clamper 121 are in contact with the slanting surfaces 115 of the tool 111, and the slanting surfaces 129 of the lower clampers 122 are in contact with the slanting surfaces 115 of the tool 111, the four elastic materials 133 are moored to the spring hook portions 131 and 132 of the upper and lower clampers 121 and 122.

While the four elastic materials 133 are moored to the four spring hook portions 131 and 132, the elastic materials 133 are separate from the tool 111 and the upper and lower clampers 121 and 121, the elastic materials generate spring force in a contraction direction, and the spring force urges the upper and lower clampers 121 and 122 in a direction that they approach each other. Thereby, as shown in FIG. 20 and FIG. 21, the upper and lower clampers 121 and 122 hold the tool 111 by an elastic function in such a manner that they sandwich the tool 111. In FIG. 20, the lower bonding working portion 113 of the tool 111 is situated below the under surfaces of the lower clampers 122.

The ultrasonic vibration bonding apparatus 141 which uses the upper and lower clampers 121 and 122 for holding the tool 111 shown in FIG. 20 and FIG. 21 by the elastic function of the elastic materials 133 will be described with reference to FIG. 22. The apparatus body 142 of the ultrasonic vibration bonding apparatus 141 has a working space 143 which is open in front, left and right directions in its front lower portion and an air cylinder 144 as a pressure unit in its upper inner portion for defining a portion above the working space 143. The lower end of a piston rod 145 projecting downward from the air cylinder 144 is arranged in the working space 143.

The upper and lower clampers 121 and 122 for holding the tool 111 shown in FIG. 20 by the elastic function of the elastic materials 133 are attached to the lower end of the piston rod 145 arranged in the working space 143. The lower portion of the apparatus body 142 for defining a portion behind the working space 143 is installed on a batholith which constitutes a base for setting the ultrasonic vibration bonding apparatus 141 in a production line or the like. A mounting table 147 is installed on the top of the batholith 146 for defining a portion below the working space 143.

How to carry out ultrasonic vibration bonding using the ultrasonic vibration bonding apparatus 141 will be described hereinafter. The upper and lower clampers 121 and 122 holding the tool 111 are attached to the lower end of the piston rod 145, and the tool 111 and the transducer 20 are connected to each other by a headless screw 136. One end of the tool 111 and the output end of the transducer 20 are brought into contact with each other by this bonding. A plurality of members 151 to be bonded together made from metals are placed upon the mounting table 147 in such a manner that they are placed one upon the other.

In this state, the holder 171 is moved down in a direction shown by the arrow Y in FIG. 20 by the operation of the air cylinder 144, the bonding working portion 113 and the mounting table 147 hold the members 151 and 152 to be bonded together by pressure, ultrasonic vibration output from the transducer 20 is transmitted to the tool 111, the bonding working portion 113 vibrates in a direction shown by the arrow X, this vibration is transmitted from the bonding working portion 113 to the members 151 and 152, and the contact surfaces of the members 151 and 152 vibrate in a horizontal direction, and are activated and bonded together while they are pressed by the bonding working portion 113 and the mounting table 147.

According to the structure of the twelfth embodiment, the upper and lower clampers 121 and 122 hold the support portions 114 of the tool 111 from a vertical direction by the elastic function of the elastic materials 133 while the slanting surfaces 115 and the slanting surfaces 125 contact each other and the slanting surfaces 115 and the slanting surfaces 129 contact each other. Therefore, the positioning of the tool 111 with respect to the upper and lower clampers 121 and 122 can be carried out accurately by the wedge function of the slanting surfaces 115, 25 and 29 which contact each other, and the members 151 and 152 can be bonded together properly.

Even when the positions of the minimum vibration amplitude points f2 and f4 of the tool 111 with respect to the root portions 117 are shifted from their theoretical positions by weight applied to the tool 111 by the upper clamper 121 at the time of bonding and the root portions 117 vibrate, the intermediate portions 119 absorb vibration from the root portions 117 toward the end portions 118. Therefore, ultrasonic vibration generated by the transducer 20 can be transmitted from the tool 111 to the bonding working portion 113 efficiently and properly and not only the tool 111 but also the upper and lower clampers 121 and 122, the elastic materials 133 and the cylinder piston 45 do not become shaky.

When the tool 111 is held by the holder 171 at both sides, the support distance between the two root portions 117 can be set equal to or shorter than the wavelength of resonance frequency and the tool 111 becomes small in size and light in weight. For example, when the members 151 and 152 to be bonded together are a semiconductor chip and a circuit board and the semiconductor chip is mounted on the circuit board by ultrasonic vibration bonding, it is easy to control weight to be applied for bonding at the time of bonding even if weight to be applied for bonding is low because the number of bumps of the semiconductor chip is small. Even when the number of bumps of the semiconductor chip is large and weight to be applied for bonding is high, deflection which exerts a bad influence upon the surface mounting of the semiconductor chip on the circuit board does not occur in the tool 111, and all the bumps of the semiconductor chip and all the pads of the circuit board are properly bonded together because the support distance is set equal to or shorter than the wavelength of resonance frequency.

Figure 23:
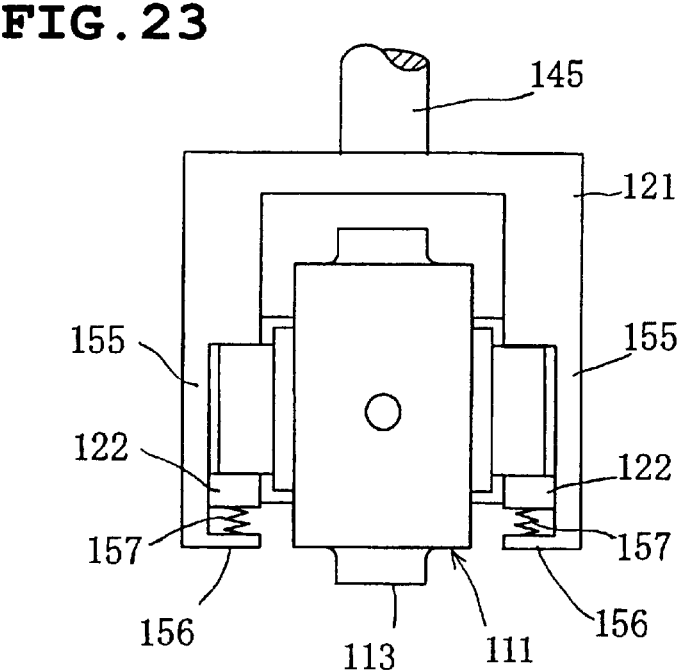
FIG. 23 is a front view of the assembly of a tool and support unit according to a thirteenth embodiment of the present invention.

FIG. 23 shows a thirteenth embodiment of the present invention. As shown in FIG. 23, arm portions 155 are provided on the upper clamper 121 in such a manner that they extend downward, the lower clampers 122 are attached to the arm portions 155 by unshown guides in such a manner that they can move in a vertical direction, elastic materials 157 are installed in gaps between spring receiving portions 156 extending inward from the arm portions 155 and the lower clampers 122 in a contracted state, the lower ends of the elastic materials 157 contact the spring receiving portions 156, and the upper ends of the elastic materials 157 contact the lower clampers 122.

In this state, the elastic materials 157 generate spring force in an extension direction which urges the upper and lower clampers 121 and 122 in a direction that they approach each other. Thereby, the slanting surfaces 115 and the slanting surfaces 125 contact each other, the slanting surfaces 115 and the slanting surfaces 129 contact each other, the upper and lower clampers 121 and 122 hold the tool 111 by an elastic function in such a manner that they sandwich the tool 111, the lower bonding working portion 113 of the tool 111 is located below the under surfaces of the spring receiving portions 156, the positioning of the tool 111 with respect to the upper and lower clampers 121 and 122 can be carried out accurately by the wedge function of the slanting surfaces 115, 25 and 29 which contact each other as in the twelfth embodiment, and the members 151 and 152 can be bonded together properly.

Figure 24:
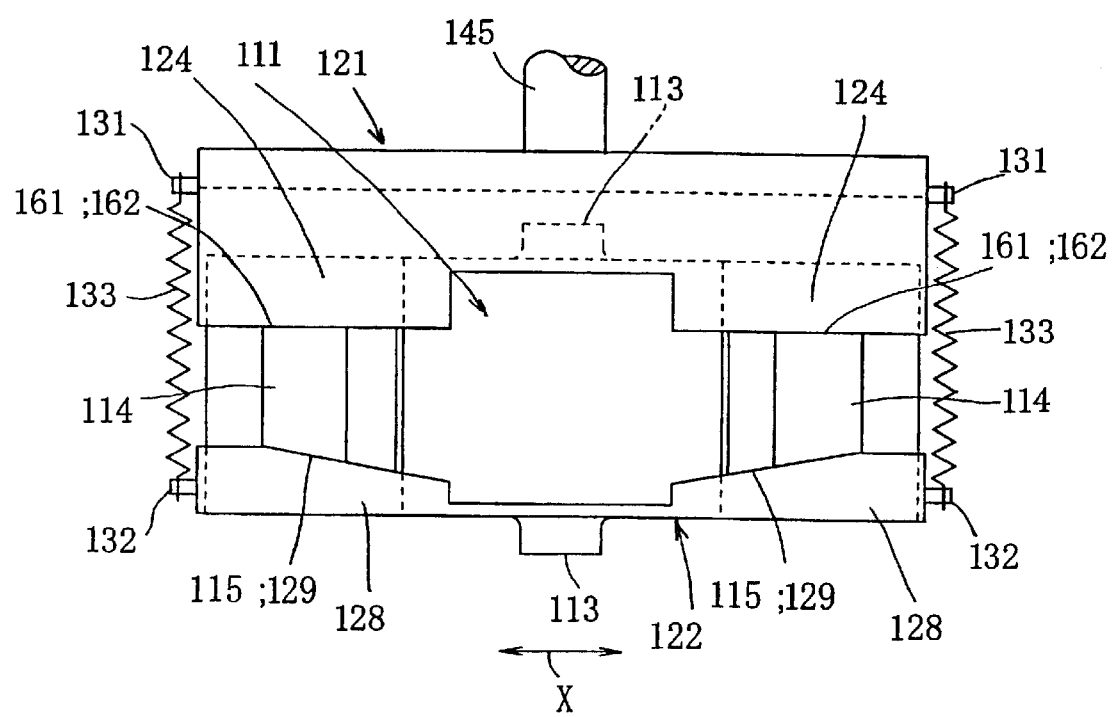
FIG. 24 is a front view of the assembly of a tool and support unit according to a fourteenth embodiment of the present invention.

FIG. 24 shows a fourteenth embodiment of the present invention. As shown in FIG. 24, in the fourteenth embodiment, when the upper surfaces of the support portions 114 are formed as flat surfaces 161 parallel to the bonding working portions 113 and the lower surfaces of the support portions 114 are formed as slanting surfaces 115, the under surfaces of the grip portions 124 of the upper clamp 121 are formed as flat surfaces 162 corresponding to the flat surfaces 161 of the support portions 114, and slanting surfaces 129 are formed on the lower clampers 122. In the case of the fourteenth embodiment, weight is applied to the support portions 114 of the tool 111 from the upper clamper 121 in a vertical direction without generating an oblique component, the support portions 114 do not receive oblique external force that they move in a vibration direction X, and the control of weight to be applied for bonding at the time of bonding can be carried out very easily.

The inclination directions of the slanting surfaces 115 may be opposite to the inclination directions of FIG. 17 so that the vertical width of the support portion 114 gradually increases from the center toward both ends of the tool 111. In this case, the inclination directions of the slanting surfaces 128 and 129 in contact with the slanting surfaces 115 incline d in opposite directions are opposite to those of FIG. 17. The slanting surfaces 115 may be formed on the upper or lower surfaces of the support portions 114, and slanting surfaces corresponding to the slanting surfaces 115 of the support portions 114 may be formed on either one of the upper and lower clampers 121 and 122. For example, when the upper surfaces of the support portions 114 are formed as the slanting surfaces 115 and the lower surfaces of the support portions 114 are formed as flat surfaces parallel to the bonding working portions 113, the slanting surfaces 125 are formed on the upper clamper 121 and the top surfaces of the grip portions 128 of the lower clampers 122 are formed as flat surfaces corresponding to the flat surfaces of the support portions 114.

In the above embodiments, the tool 1, 31 or 111 is as long as the wavelength of resonance frequency. It may be as long as a multiple of the wavelength.

In the above embodiments, the transducer 20 is directly connected to one end of the tool 111. The transducer 20 may be attached to the tool 1, 31 or 111 through an unshown booster which has a length equal to the half of the wavelength of resonance frequency or a multiple of the half of the wavelength. In this case, the tool 1, 31 or 111 and the booster are connected coaxial to each other by a headless screw corresponding to the headless screw 136 shown in FIG. 17. This can be also applied to the tool 1, 31 or 111 which comprises an ultrasonic horn having the bonding working portions 3, 4, 33 or 113 and a booster having the support portions 114. In this case, the ultrasonic horn and the booster are connected coaxial to each other by a headless screw corresponding to the headless screw 136.

A slot, hole or slit may be formed in the intermediate portions 5b to 8b, 40 or 119 to adjust the balance of vibration.

The tool 1, 31 or 111 includes the bonding working portions 3, 4, 33 or 113, the support portions 5 to 8, 34 or 114 and the connection portions 37 or 117 as a single body, respectively. However, the tool 111, the bonding working portions 3, 4, 33 or 113, and the support portions 5 to 8, 34 or 114/connection portions 37 or 117 may be formed separately, and the bonding working portions 3, 4, 33 or 113 and the support portions 5 to 8, 34 or 114/connection portions 37 or 117 may be screwed into the tool 1, 31 or 111.

What is claimed is:

1. An ultrasonic vibration bonding tool comprising:

a square bar-shaped horn body;

bonding working portions provided on the upper and lower surfaces of the horn body at the central maximum vibration amplitude point, respectively; and crooked support portions which project from the front and rear surfaces of the horn body at two minimum vibration amplitude points which are separated the same distance from the bonding working portions on both sides.

2. The ultrasonic vibration bonding tool of claim 1, wherein each of the support portions comprises a thick root portion connected to the horn body, a thin intermediate portion which extends from the root portion toward the end portion of the horn body without contacting the horn body, a thick projecting portion which projects outward from the intermediate portion, and an end portion which extends from the projecting portion toward the center of the horn body without contacting the intermediate portion.

3. The ultrasonic vibration bonding tool of claim 2, wherein the end portion has a through hole for storing a bolt.

4. The ultrasonic vibration bonding tool of claim 3, wherein the end portion has a recess portion for storing the head portion of a bolt, which is larger than the through hole for storing a bolt.

5. An ultrasonic vibration bonding tool comprising support portions which are provided on a horn body asymmetric about the vibration direction of the horn body as a linear symmetry axis.

6. The ultrasonic vibration bonding tool of claim 5, wherein each of the support portions comprises a thick root portion which projects from the position of the minimum vibration amplitude point of the horn body, a thin intermediate portion which extends from the root portion toward the end portion of the horn body without contacting the horn body, a thick projecting portion which projects outward from the intermediate portion, and an end portion which extends from the projecting portion toward the center of the horn body without contacting the intermediate portion.

7. The ultrasonic vibration bonding tool of claim 5, wherein the support portions have an attachment surface parallel to the bonding working portion of the horn body.

8. The ultrasonic vibration bonding tool of claim 1, wherein the support portions have an attachment surface perpendicular to the bonding working portion of the horn body.

9. An ultrasonic vibration bonding tool comprising support portions which project outward from the minimum vibration amplitude points of a horn body and slanting surfaces formed on the support portions as attachment surfaces.

10. The ultrasonic vibration bonding tool of claim 9, the slanting surfaces are formed as the lower attachment surfaces of the support portions and the upper attachment surfaces of the support portions are formed as flat surfaces parallel to the bonding working portion of the horn body.

* * * * *